US007327492B2

(12) United States Patent
Yokochi

(10) Patent No.: US 7,327,492 B2
(45) Date of Patent: Feb. 5, 2008

(54) IMAGE PROCESSING DEVICE AND IMAGE PROCESSING METHOD

(75) Inventor: Atsushi Yokochi, Chiryu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1043 days.

(21) Appl. No.: 10/372,777

(22) Filed: Feb. 26, 2003

(65) Prior Publication Data

US 2003/0202193 A1 Oct. 30, 2003

(30) Foreign Application Priority Data

Feb. 27, 2002 (JP) .............................. 2002-051320

(51) Int. Cl.
*G06F 15/00* (2006.01)
(52) U.S. Cl. .................. 358/1.9; 358/2.1; 358/3.24; 358/500; 358/501; 358/515; 358/516; 358/518; 358/529; 358/532; 358/533; 358/536; 358/537; 358/540; 382/167
(58) Field of Classification Search .......... 358/1.9, 358/2.1, 3.24, 501, 515, 516, 518, 529, 532, 358/533, 536, 537, 540; 282/203; 382/167
See application file for complete search history.

(56) References Cited

U.S. PATENT DOCUMENTS 5,408,338 A * 4/1995 Koike .................... 358/448
5,740,333 A * 4/1998 Yoh et al. ................ 358/1.9
6,449,060 B1   9/2002 Kawai et al.
6,473,202 B1 * 10/2002 Kanata et al. ........... 358/2.1
2002/0176105 A1 11/2002 Kawai et al.
2005/0206983 A1 9/2005 Kawai et al.
2005/0243353 A1 11/2005 Kawai et al.

FOREIGN PATENT DOCUMENTS

| JP | A H10-42151 | 2/1998 |
| JP | A H11-355585 | 12/1999 |
| JP | A 2000-287092 | 10/2000 |
| JP | A 2001-24898 | 1/2001 |
| JP | A 2002-44471 | 2/2002 |

* cited by examiner

*Primary Examiner*—Twyler Lamb
*Assistant Examiner*—Vu Hang
(74) *Attorney, Agent, or Firm*—Oliff & Berridge, PLC

(57) ABSTRACT

In a black character detection processing, RGB data read from a line buffer is converted into YIQ data. For a subject pixel, a subject area centered on the subject pixel is set, and a judgment pixel that has the lowest brightness in the subject area is set. Then, a judgment area is set as being centered on the judgment pixel. If the absolute values of the averages of chroma components I and Q in the judgment area are both less than the corresponding thresholds T1 and T2, the subject pixel is determined as being an achromatic pixel. Black codes are added to fine-line pixels and edge pixels if the fine-line pixels and edge pixels are determined as being achromatic. Thus, the fine-line pixels and edge pixels can be specified as to be printed in black monochromatic ink. Therefore, black character or similar fine-line or edge part images can be outputted with high quality.

11 Claims, 16 Drawing Sheets

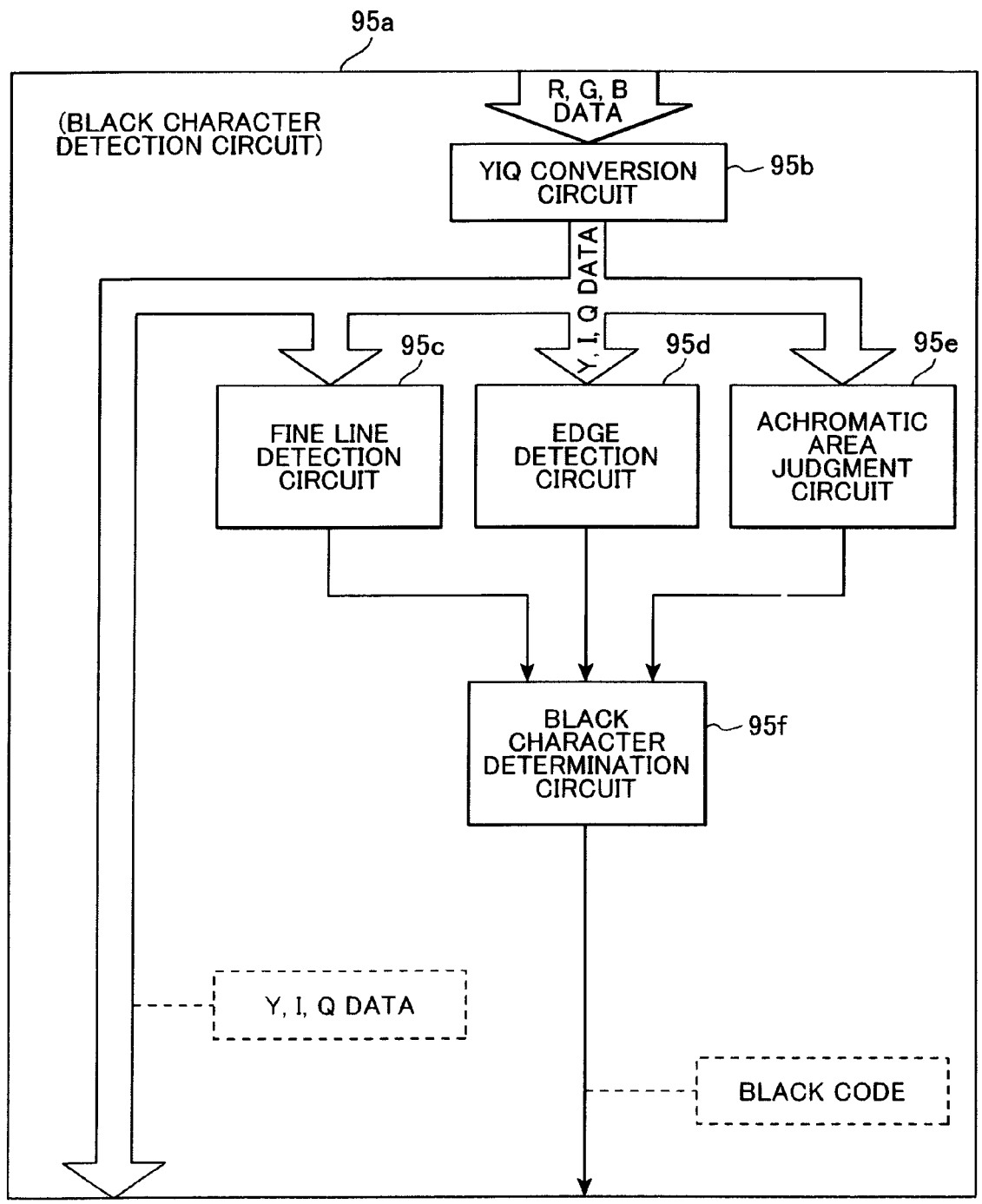

| -1 | 0 | 1 |
|---|---|---|
| -2 | 0 | 2 |
| -1 | 0 | 1 |

Y↓    →X

SF2

| -1 | -2 | -1 |
|---|---|---|
| 0 | 0 | 0 |
| 1 | 2 | 1 |

|  | X1 | X2 | X3 |
|---|---|---|---|
| Y1 | 100 | 140 | 170 |
| Y2 | 120 | 150 | 180 |
| Y3 | 130 | 160 | 190 |

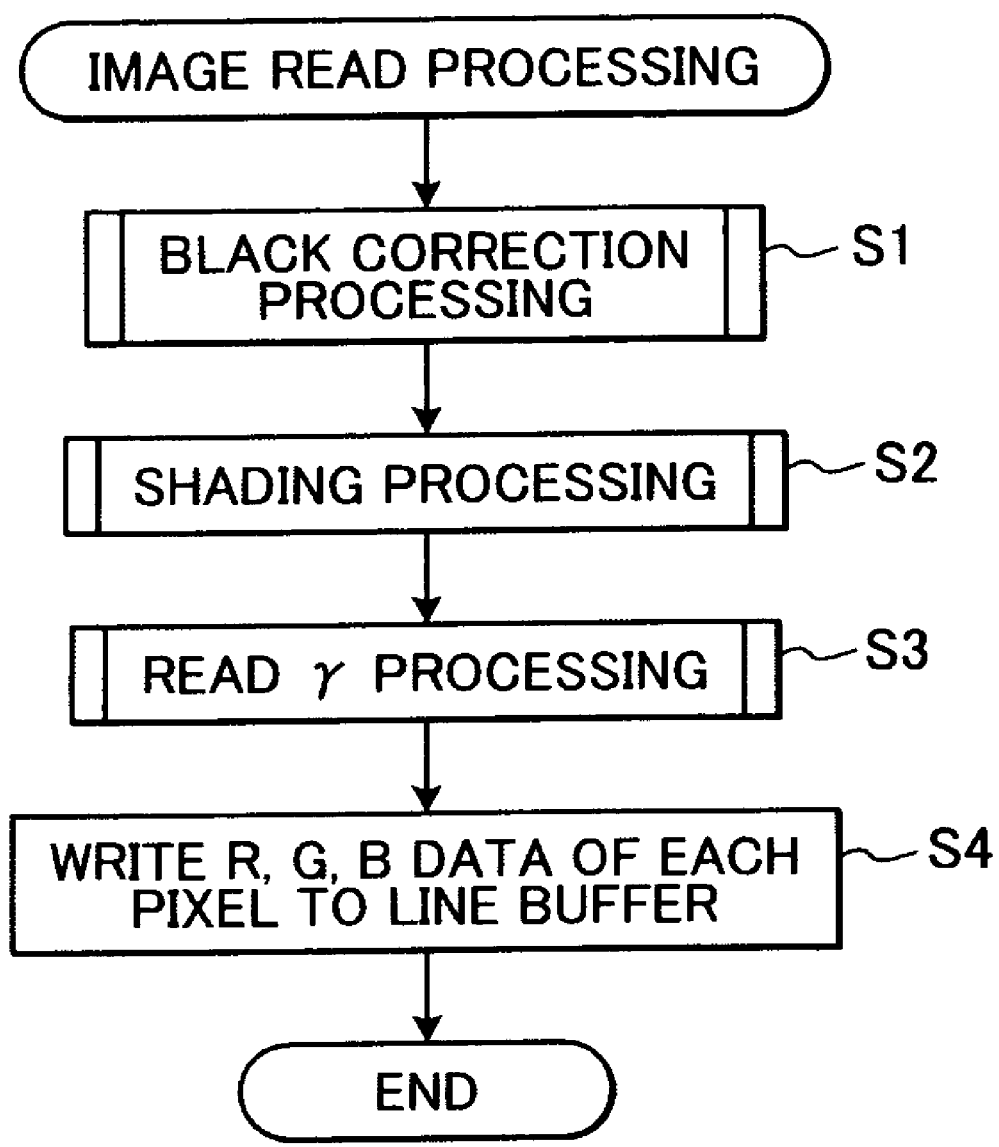

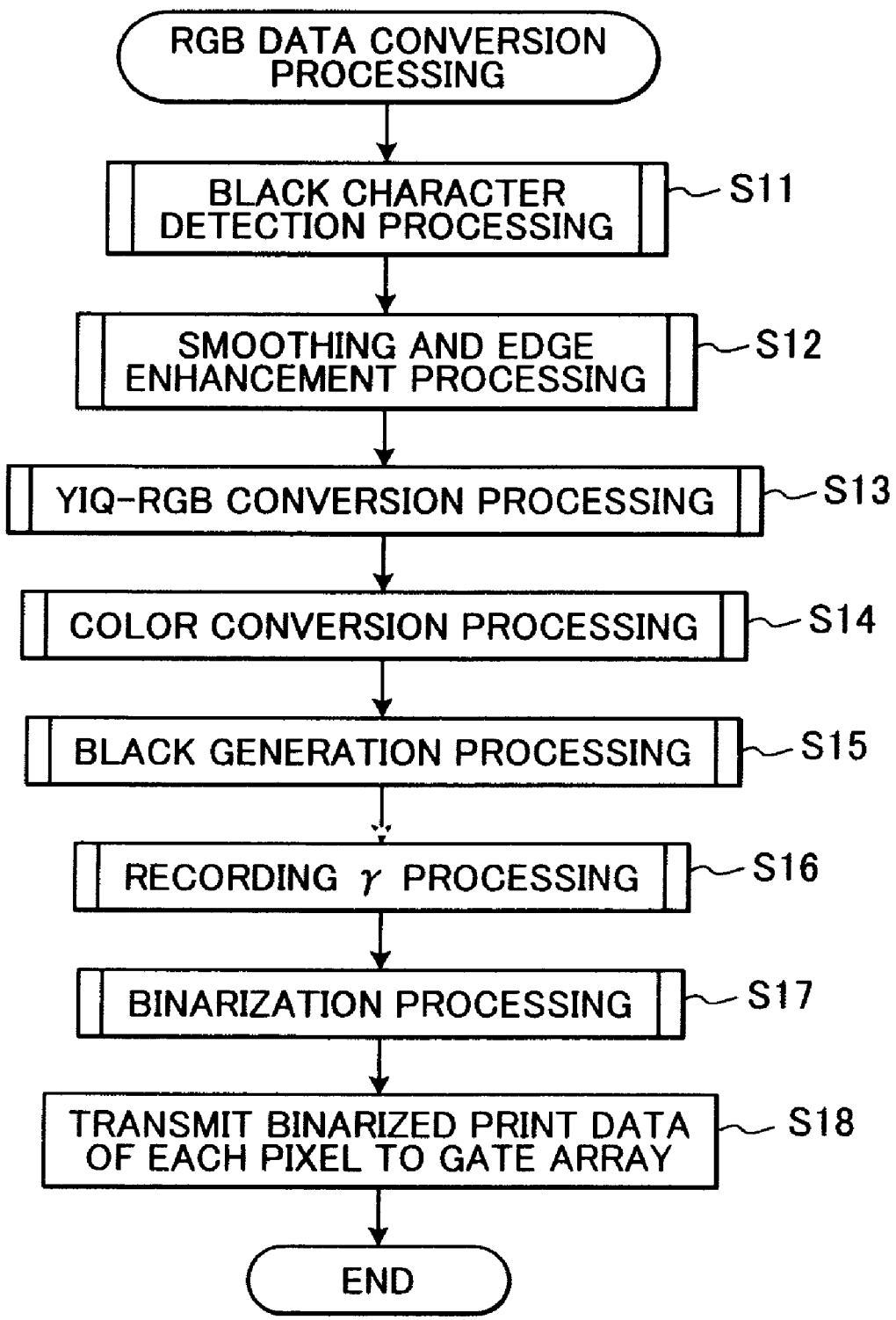

IMAGE PROCESSING DEVICE AND IMAGE PROCESSING METHOD

BACKGROUND OF THE INVENTION

1. Field of the Invention

The present invention relates to an image processing device and image processing method.

2. Description of Related Art

Image processing devices, such as color copiers, create color images by controlling a scanner to read an image and by controlling an ink-jet printer to print the read image.

Normally, the scanner employs a line sensor such as a CCD line sensor or a CIS (Contact Image Sensor) line sensor. The line sensor converts the read image into analog electrical signals. The analog electrical signals are converted into digital signals, and print data is produced based on the digital signals. The ink jet printer performs printing based on the print data to reproduce the original image.

Especially in a color copier that performs full-color image reproduction, the line sensor includes a R-line sensor unit for red, a G-line sensor unit for green, and a B-line sensor unit for blue. When the line sensor reads a color image on a document line by line, each line sensor unit reads the color image line by line and detects a corresponding color component of the image. Thus, each line sensor unit produces a successive groups of corresponding color-component image data for successive lines read by the subject line sensor unit. After being digitized, three groups of red, green, and blue image data indicative of the same line image are converted together into a group of print data for reproducing the color of the subject line image.

It is noted that when the ink-jet printer contains cyan, magenta, and yellow inks, the group of print data is made up from print data for cyan, magenta, and yellow. When the ink-jet printer contains cyan, magenta, yellow, and black ink, the group of print data is made up from print data for cyan, magenta, yellow, and black. Print data for each ink is compared with a threshold and binarized into dot-forming data or non-dot forming data according to the comparison results. The ink-jet printer prints each line image by selectively ejecting ink of various colors based on the corresponding print data group, thereby selectively superimposing the various inks. The read image is reproduced in this way.

SUMMARY OF THE INVENTION

However, when image reading is executed using the CDD, CIS, or similar reading device, color misalignment occurs due to various factors, including: mechanical vibration, chromatic aberration of the lens employed in the reading device, difference in MTF, and feed precision.

If read positions by the R-, G-, and B-line sensor units are slightly shifted from one another, the R-, G-, and B-line sensor units produce red, green, and blue image data groups based on different lines. In such a case, if print data is obtained based on these red, green, and blue image data and ink ejection operation is executed by the print data, chromatic color ink bleeding will occur in the area in which the misaligned print data is reproduced. Especially, definition or clearness of black characters is deteriorated when chromatic color ink bleeding occurs in the vicinity of the characters.

It is additionally noted that in an image, a black character is normally located adjacent to a background color, but is not located adjacent to a solid black area. Accordingly, the peripheral portion in the character is detected as being lighter than its actual density by the reading device.

Because the black character is ordinarily made up from thin or fine portions, the entire portion of the character is detected as lighter than its actual density. Accordingly, the reading device fails to read the color of the black character as perfectly black.

Because the read data erroneously indicates the density of the black character as lighter than the actual density, if the read data is converted into print data and the print data is binarized into dot-forming data or non-dot forming data by the normally-used threshold, the black character will be printed at an erroneously-reduced contrast with respect to the background.

It is conceivable to decrease the amount of the threshold in order to ensure that the black character will be outputted with a high-density black. However, in such a case, black tonal representation will be erroneously shifted to a lower (black) side and will be deteriorated. Black spots will become noticeable in low density regions.

In view of the above-described drawbacks, it is an objective of the present invention to provide an image processing device and image processing method that perform judgment as to whether or not each pixel is achromatic, and is that can eliminate color misalignment and output a well-defined black image.

In order to attain the above and other objects, the present invention provides an image processing device, comprising: data receiving means for receiving a plurality of sets of digital input signals for a plurality of pixels that constitute a desired image, each set of digital input signals including digital input signals for at least three color components indicative of a color state of the corresponding pixel; subject area setting means for setting a subject area that is formed from several pixels, the several pixels including a subject pixel to be processed and being arranged adjacent to one another, the subject pixel being located at a center of the subject area; judgment pixel setting means for setting, as a judgment pixel, a pixel that has the smallest brightness in the subject area; and achromatic determining means for determining whether or not the subject pixel is achromatic by judging the chroma component of the judgment pixel.

According to another aspect, the present invention provides an image processing method, comprising: receiving a plurality of sets of digital input signals for a plurality of pixels that constitute a desired image, each set of digital input signals including digital input signals for at least three color components indicative of a color state of the corresponding pixel; setting a subject area that is formed from several pixels, the several pixels including a subject pixel to be processed and being arranged adjacent to one another, the subject pixel being located at a center of the subject area; setting, as a judgment pixel, a pixel that has the smallest brightness in the subject area; and determining whether or not the subject pixel is achromatic by judging the chroma component of the judgment pixel.

BRIEF DESCRIPTION OF THE DRAWINGS

The above and other objects, features and advantages of the invention will become more apparent from reading the following description of the preferred embodiment taken in connection with the accompanying drawings in which:

FIG. 4 is a block diagram showing the electrical configuration of a black character detection circuit in the color copier;

FIG. 5A is an explanatory diagram illustrating an example of a pair of Sobel filters;

FIG. 5B is an explanatory diagram illustrating an example of Y data at coordinates of (X1, Y1) to (X3, Y3) in an original image;

FIG. 6 is a flowchart of image read processing executed by a main-unit-side control board of FIG. 2;

FIG. 7 is a flowchart of RGB data conversion processing executed by an RGB data conversion circuit shown in FIG. 2;

Figure 9:
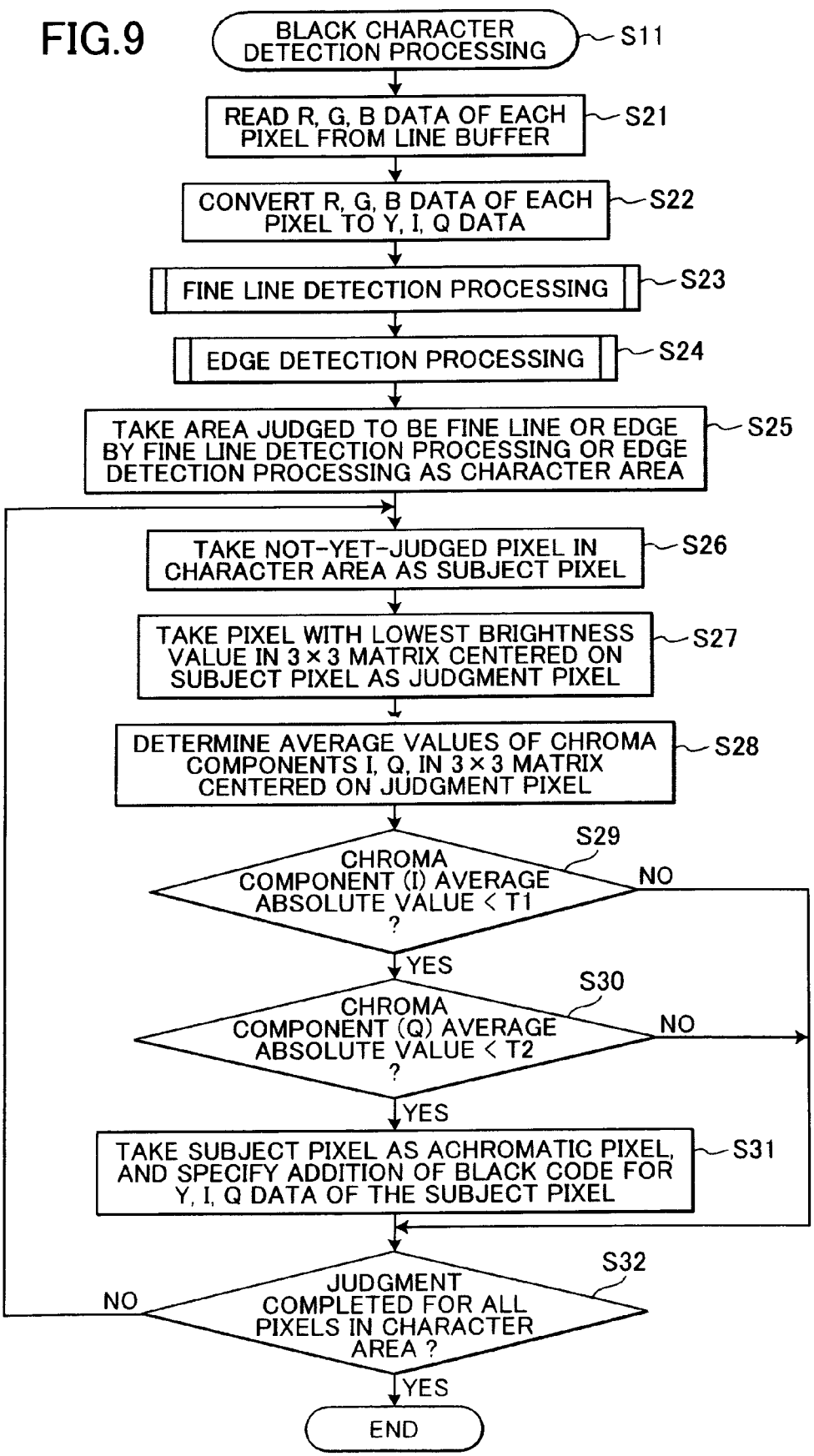
Figure 10:
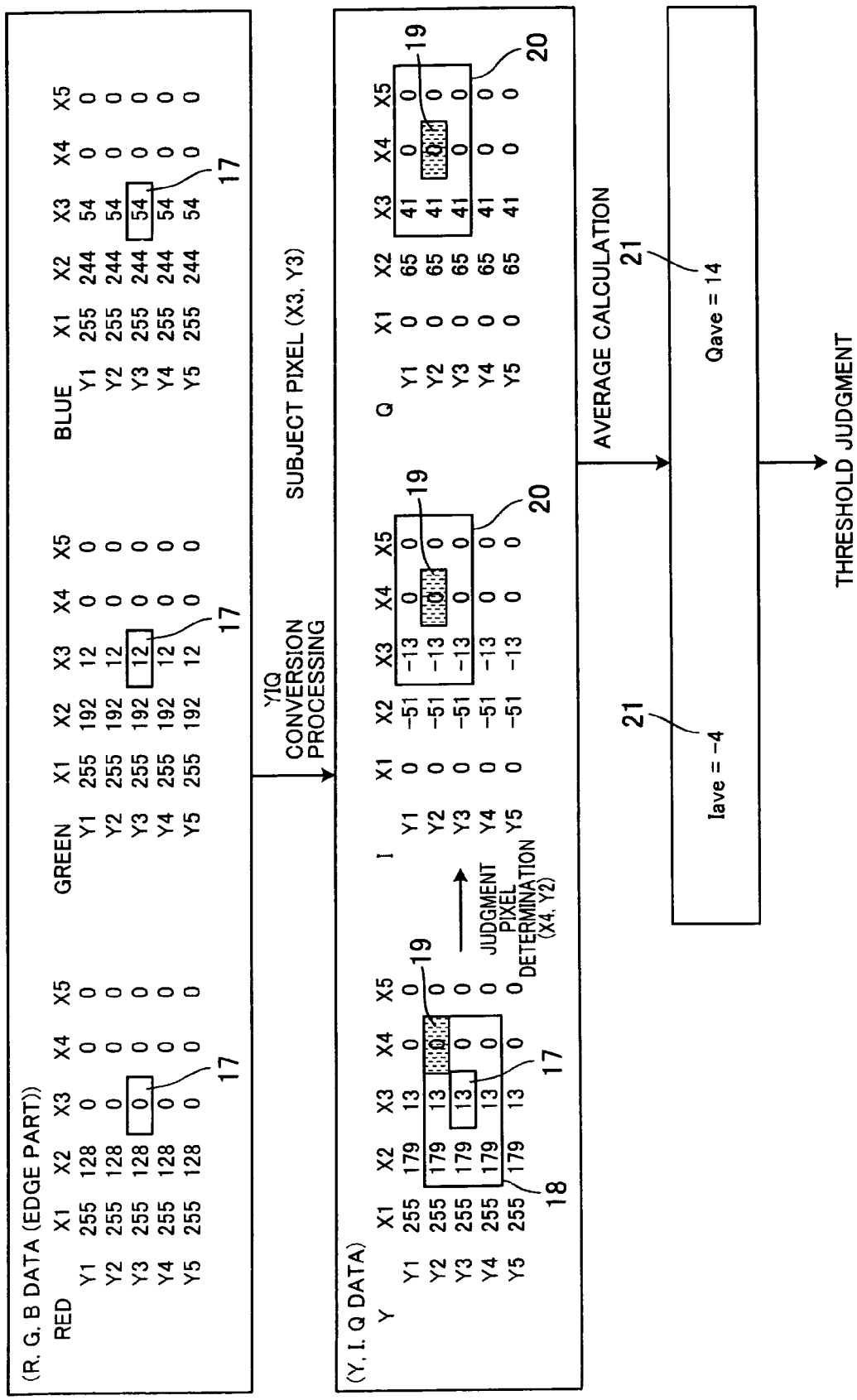
Figure 11:
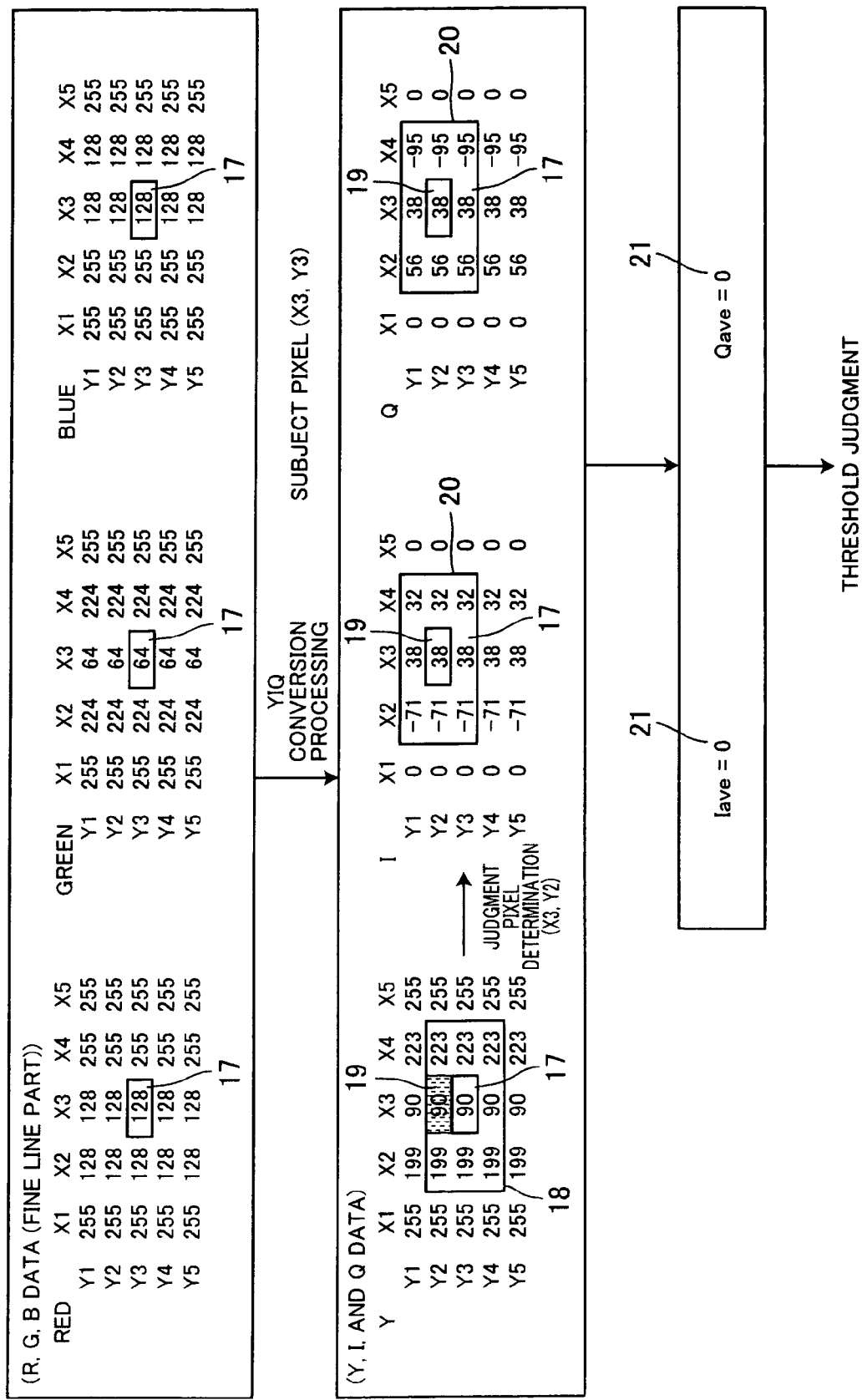
Figure 12:
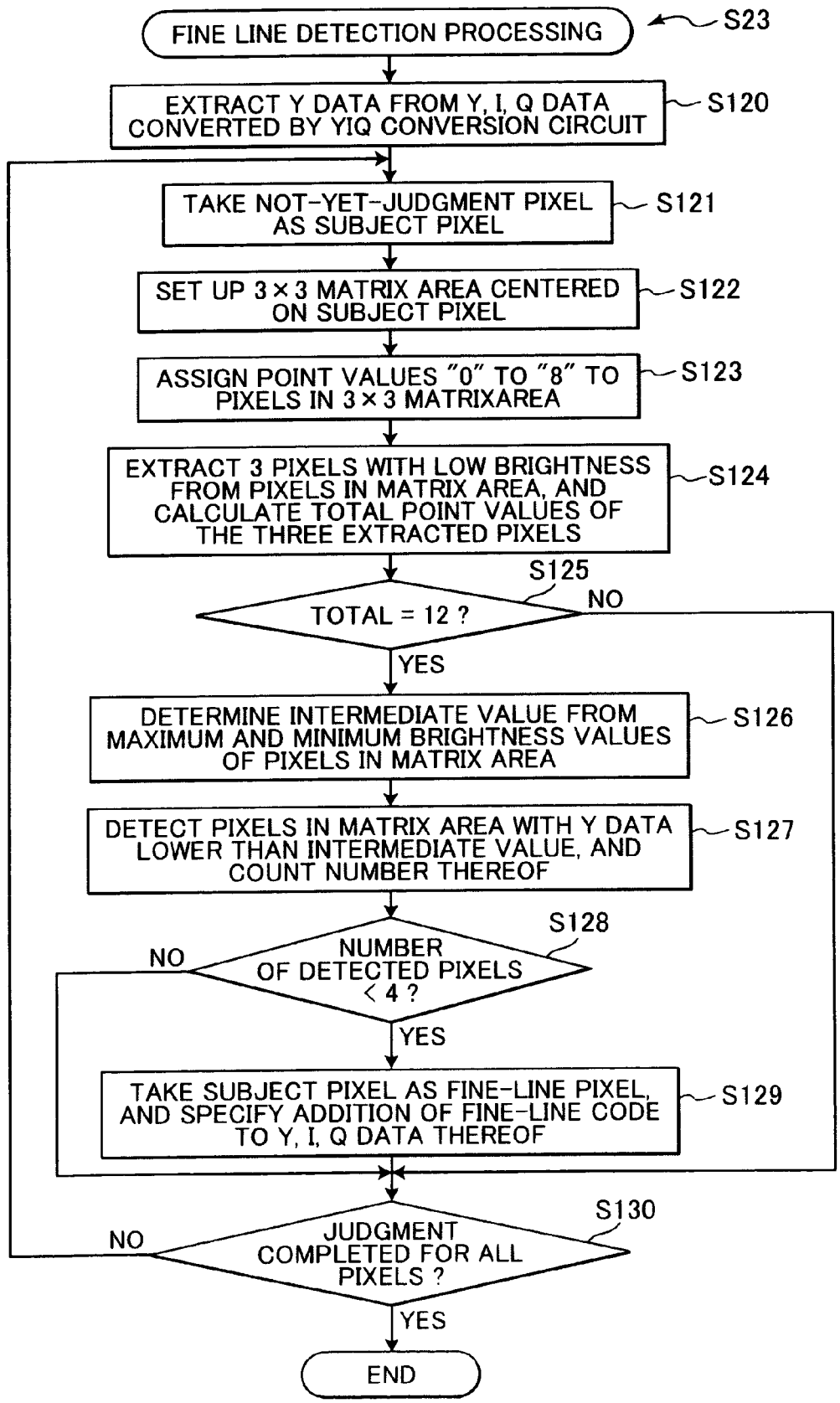
Figure 13:
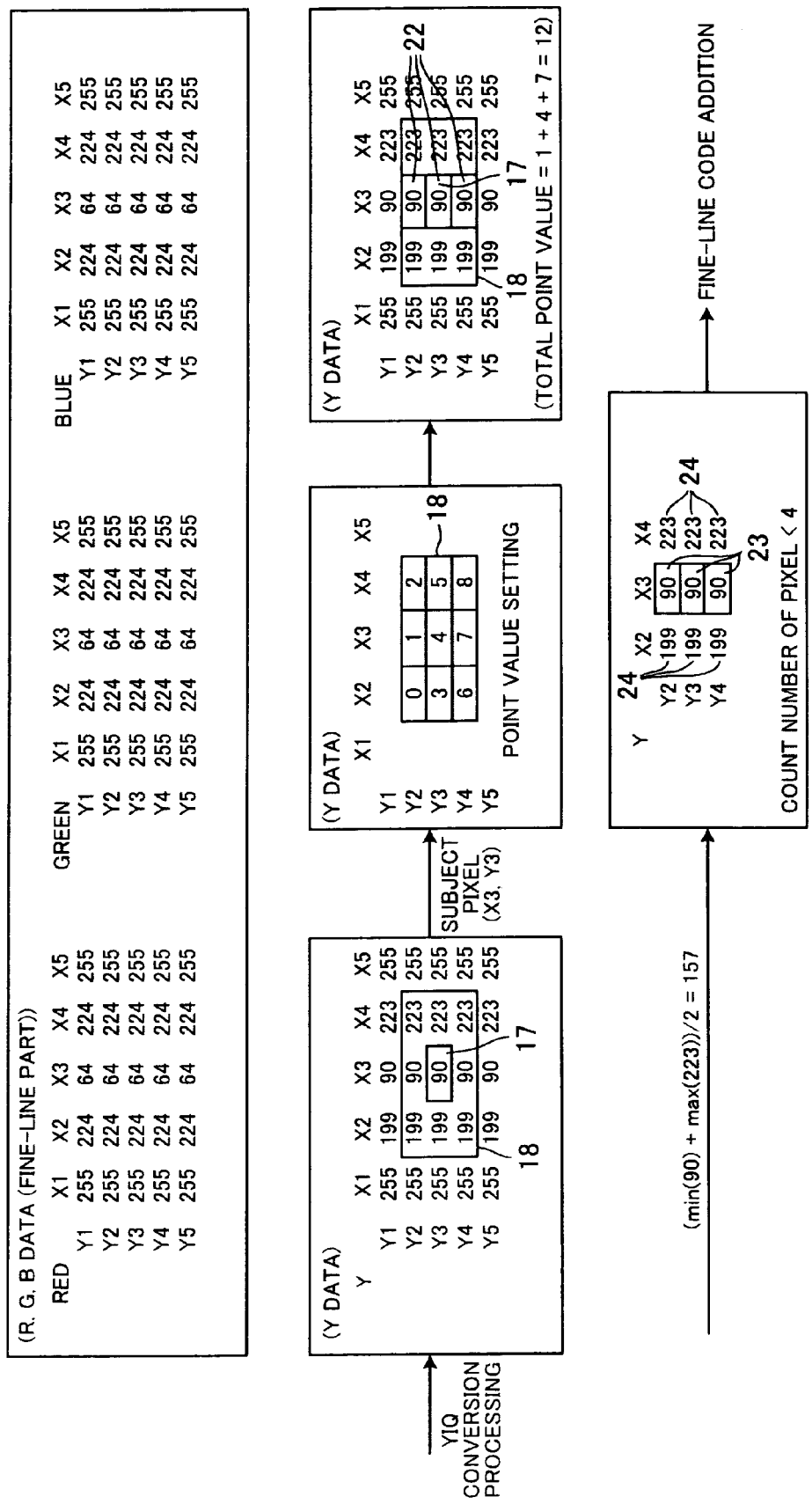
Figure 14:
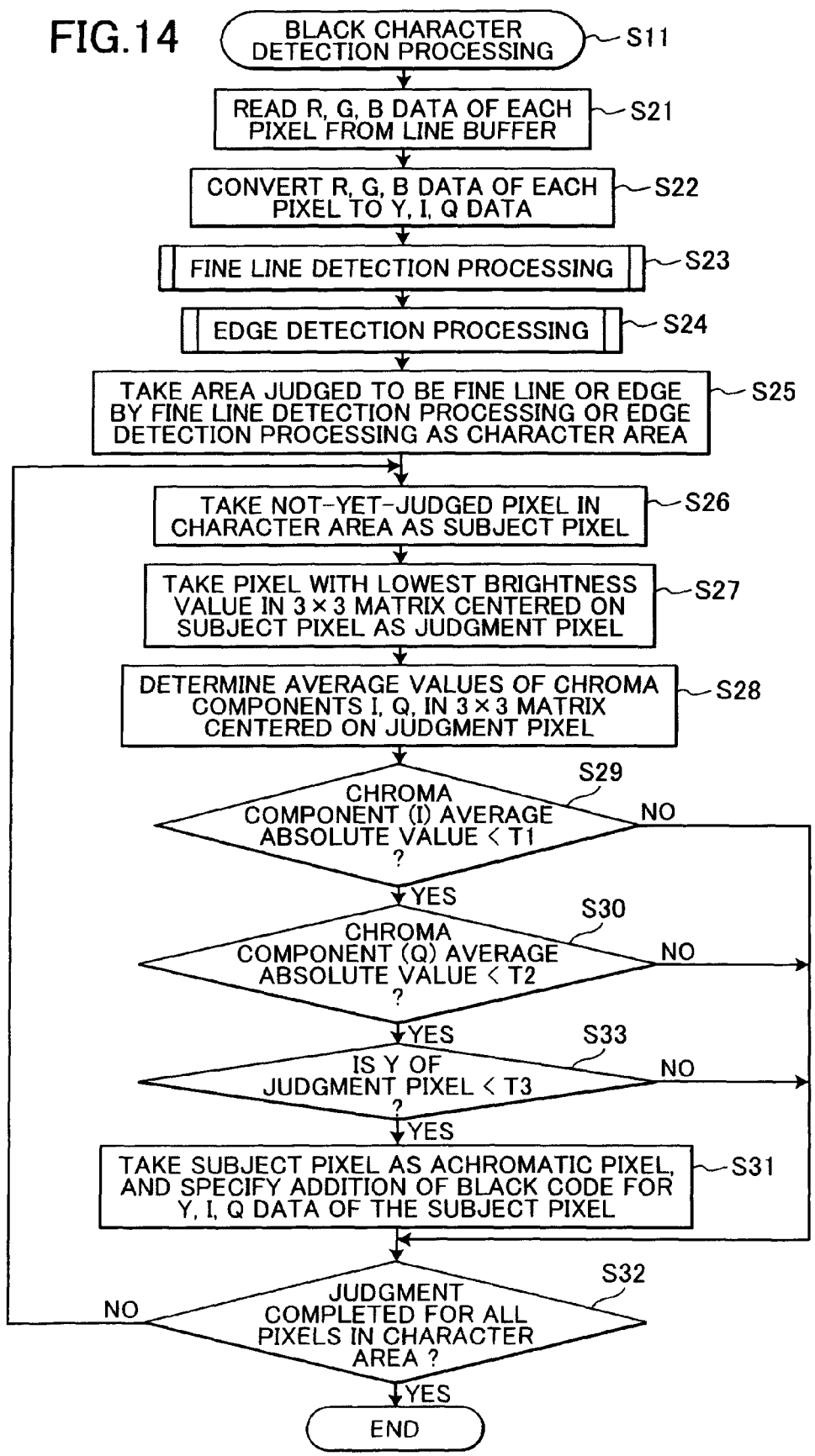
Figure 15:
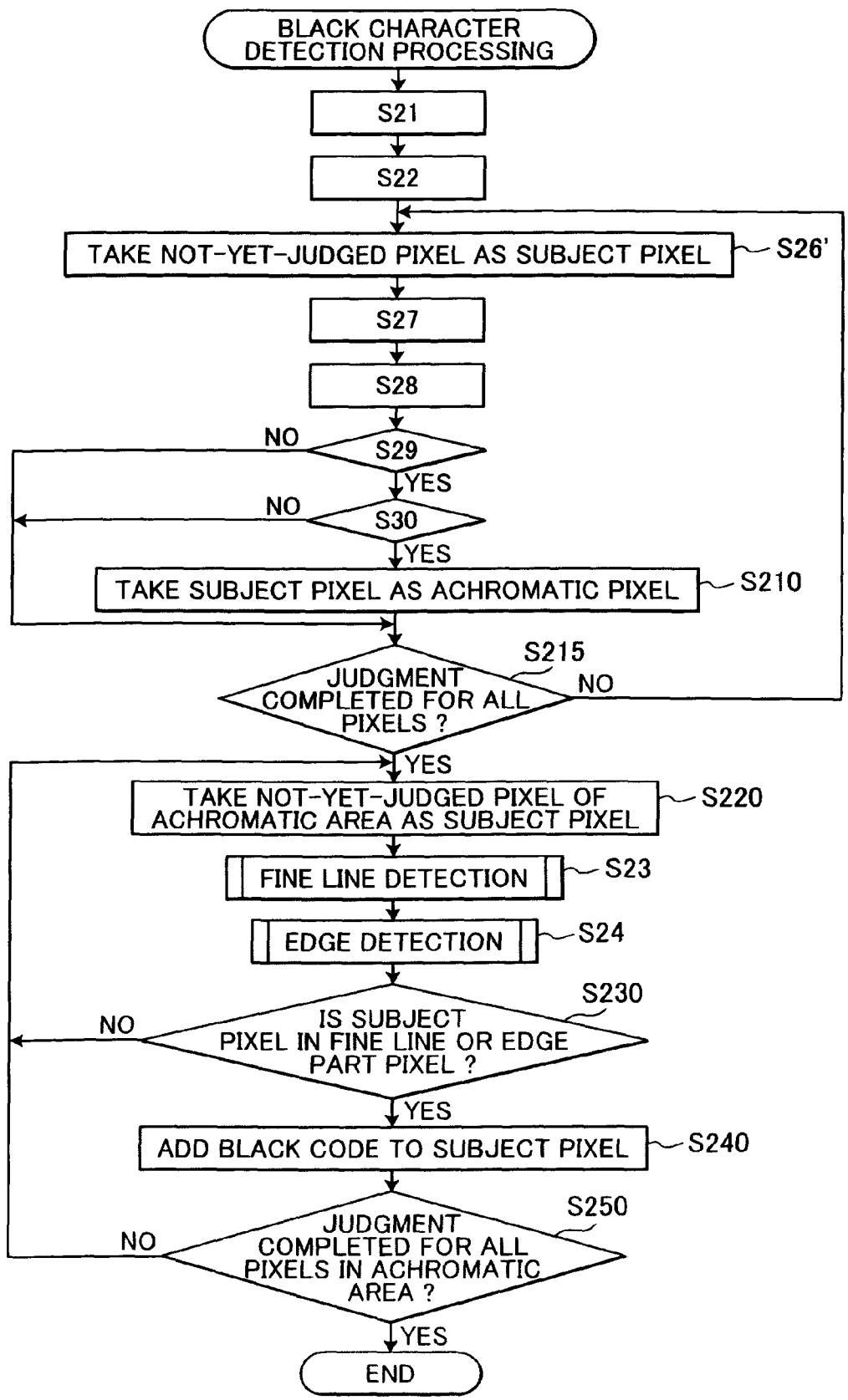

rig. 8 is a flowchart of black generation processing executed in the RGB data conversion processing of FIG. 7;

FIG. 9 is a flowchart of black character detection processing executed within the RGB data conversion processing of FIG. 7;

FIG. 10 illustrates how a pixel in an edge part is detected during the black character detection processing of FIG. 9;

FIG. 11 illustrates how a pixel in a fine-line part is detected during the black character detection processing of FIG. 9;

FIG. 12 is a flowchart of fine line detection processing executed within the black character detection processing of FIG. 9;

FIG. 13 illustrates how a pixel in a fine-line part is detected during the fine line detection processing of FIG. 12;

FIG. 14 is a flowchart of a first modification of the black character detection processing; and FIG. 15 is a flowchart of a second modification of the black character detection processing.

DETAILED DESCRIPTION OF THE PREFERRED EMBODIMENT

An image processing device according to a preferred embodiment of the present invention will be described while referring to the accompanying drawings wherein like parts and components are designated by the same reference numerals to avoid duplicating description.

Figure 1:
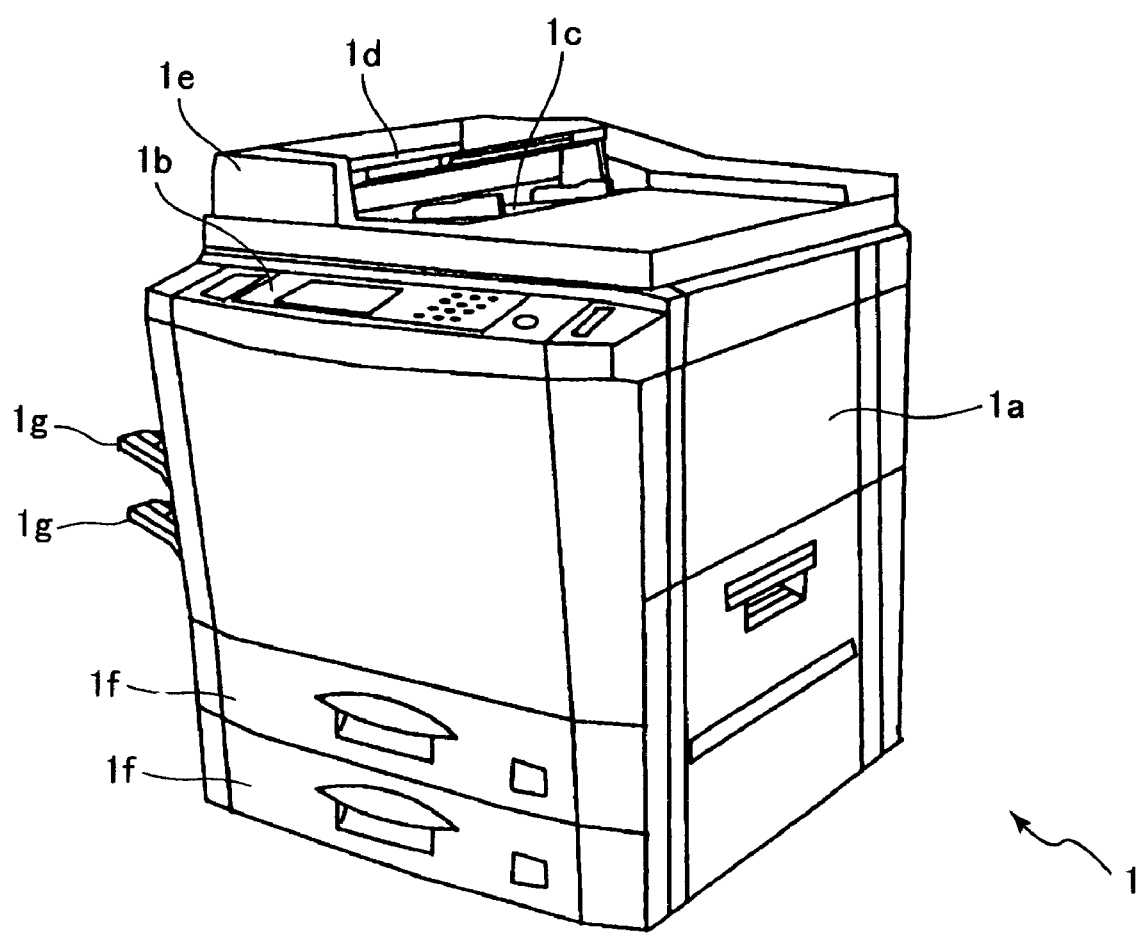
FIG. 1 is a perspective view of a color copier according to an embodiment of the present invention.

According to a preferred embodiment of the present invention, as shown in FIG. 1, a color copier 1 (image processing device) has a main unit 1a. The main unit 1a is provided with a control panel 1b on the upper front part of the main unit 1a. A plurality of keys are provided on the control panel 1b. A user operates the color copier 1 by depressing the plurality of keys on the control panel 1b.

A document feed device 1e is provided on the top of the main unit 1a. The document feed device 1e includes a document insertion aperture 1c and a document ejection aperture 1d. A document to be copied is inserted facedownward into the document insertion aperture 1c. The document inserted into the document insertion aperture 1c is fed into a reading section of the color copier 1 by the document feed device 1e. An image (original image) on this document is read as image data by a CCD line sensor 2 (FIG. 2), which is provided inside the copier 1. The document is then ejected from the document ejection aperture Id.

Paper trays if are provided at the bottom of the main unit 1a. These paper trays 1f hold stacked sheets of recording paper, and can be pulled forward. Recording paper for printing the read image data is supplied from one of the paper trays 1f to the interior of the main unit 1a. The recording paper is transported according to the drive of a transport motor (LF motor) 102 (FIG. 2).

Inside the main unit 1a, an ink-jet head 130 (FIG. 2) is provided at a location facing a printing surface of the supplied recording paper. The surface of the ink-jet head 130 that faces the recording paper is provided with an ink ejection surface that is provided with a plurality of nozzles. Inks of four colors (cyan, magenta, yellow, and black) are supplied to the ink-jet head 130 from an ink cartridge (not shown). Ink supplied to the ink-jet head 130 is ejected from the ink ejection surface of the ink-jet head 130.

Figure 2:
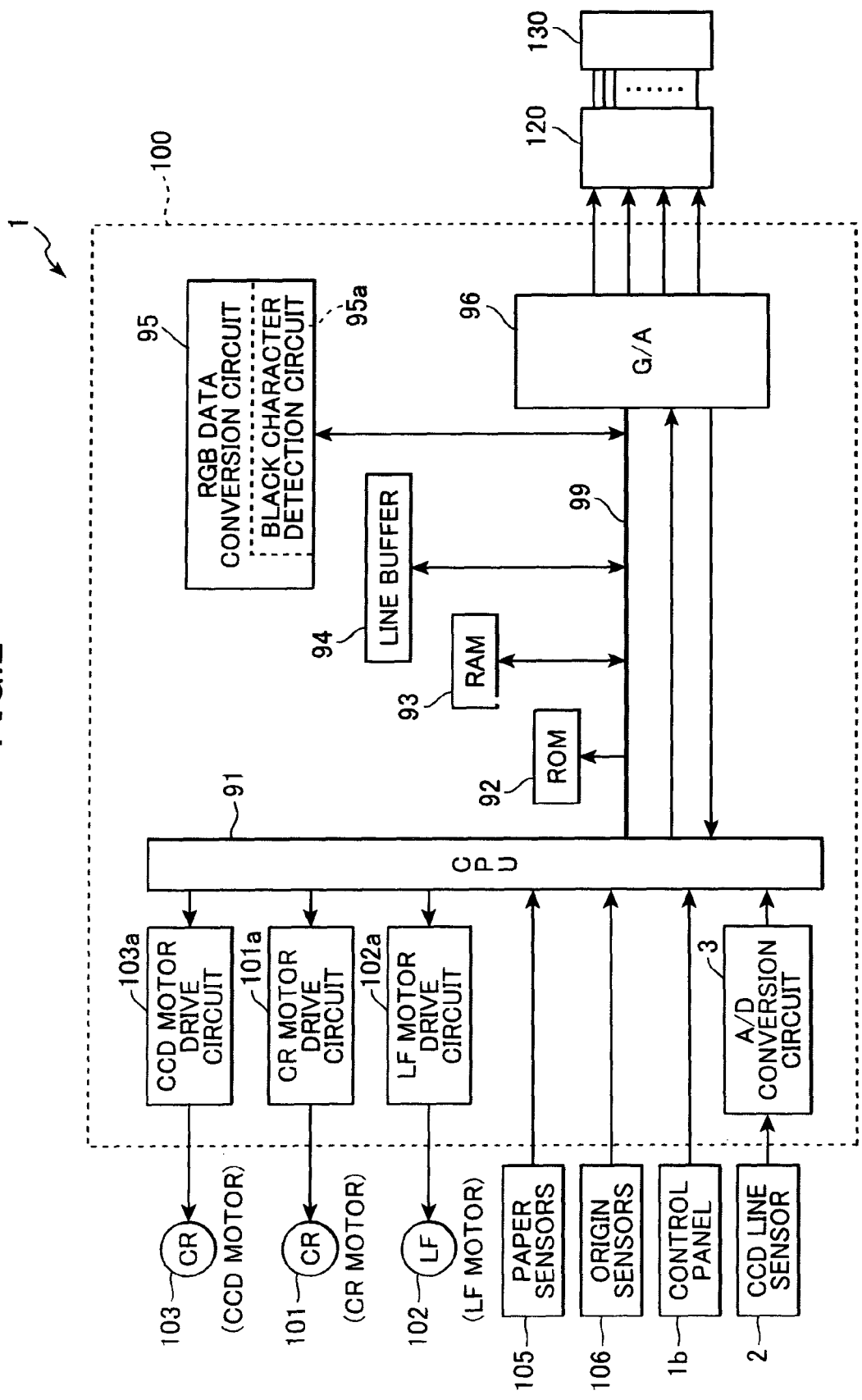
FIG. 2 is a block diagram of an electrical circuit configuration the color copier of FIG. 1.

The ink-jet head 130 is mounted on a carriage (not shown), which is driven by a carriage motor (CR motor) 101 (FIG. 2). The carriage is configured to move in a direction perpendicularly with respect to the direction of movement of the recording paper. The ink-jet head 130 prints read image data on the recording paper while moving in a direction perpendicular with respect to the direction of movement of the recording paper. The printed recording paper is discharged from one of recording paper discharging apertures 1g, which are provided on one side of the color copier 1.

As shown in FIG. 2, a control device for controlling the color copier 1 includes a main-unit-side control board 100 and a carriage board 120. The main-unit-side control board 100 includes: a single-chip microcomputer (CPU) 91, a ROM 92, a RAM 93, a line buffer 94, an RGB data conversion circuit 95, and a gate array (G/A) 96.

The CPU 91, which is a computing device, executes control of processing, such as an original image reading processing (image read processing: FIG. 6) and print processing (not shown), in accordance with a control program stored in the ROM 92. The CPU 91 generates a printing timing signal and a reset signal, and transfers these signals to the gate array 96. The control panel 1b is connected to the CPU 91, enabling each section of the color copier 1 to be controlled in accordance, with commands inputted by the user at the control panel 1b.

The CPU 91 is connected also to several drive circuits, including: a CR motor drive circuit 101a for driving the CR motor 101, an LF motor drive circuit 102a for operating the LF motor 102, and a CCD motor drive circuit 103a for driving a CCD motor 103. When a copy command is inputted from the control panel 1b, the CPU 91 drives the CCD motor 103 by outputting signals to the CCD motor drive circuit 103a, thereby driving the CCD line sensor (scanner) 2 to read the original document image Then, at a prescribed timing, the CPU 91 outputs signals to the CR motor drive circuit 101a and the LF motor drive circuit 102a to drive the CR motor 101 and LF motor 102 to execute printing on the recording paper. The LF motor 102 is a stepping motor, and is configured so that its rotational speed will be controlled by the number of pulses of an input pulse signal.

The CPU 91 is connected also to paper sensors 105 and origin sensors 106. The paper sensors 105 are provided at prescribed locations for detecting the front edge of recording paper and for detecting the document position (document size). The origin sensors 106 are provided at prescribed locations at which the carriage origin position and CCD line sensor 2 origin position should be detected. The CPU 91 controls operation of the respective devices connected to the CPU 91.

An analog-to-digital (A/D) conversion circuit 3 is also connected to the CPU 91. The analog-to-digital conversion circuit 3 is for converting analog data to digital data. The A/D conversion circuit 3 is connected to the CCD line sensor 2. The A/D conversion circuit 3 receives analog data, indicative of an original image, from the CCD line sensor 2 and converts the analog data into digital data. The A/D conversion circuit 3 executes processings, such as sampling, quantization, and binarization, onto the input analog data, and converts this data to digital data. The resultant digital data is inputted to the CPU 91, and then is written by the CPU 91 to the RAM 93.

The CCD line sensor 2 is a device, in which a plurality of CCD elements are arranged. Each CCD element receives light that is reflected after being irradiated onto the surface of an original document, converts the received light into a charge quantity by photoelectric conversion, and then outputs the charge quantity as an analog electrical signal. In this example, the CCD line sensor 2 is a line image sensor, and performs an image reading operation on a line-by-line basis on the original image. The CCD line sensor 2 can read a color image on the original document. The CCD line sensor 2 includes: a R-line sensor unit for detecting the red (R) light component, a G-line sensor unit for detecting the green (G) light component, and a B-line sensor unit for detecting the blue (B) light component. The R-line sensor unit, the G-line sensor unit, and the B-line sensor unit are arranged with gaps of several lines between them. With this configuration, the CCD line sensor 2 produces, for each pixel of the original image, a set of RGB signals for three components of red (R), green (G), and blue (B). The RGB signal sets for all the pixels in the original image indicate the original image as a color image.

The original document and the CCD line sensor 2 are moved relative to each other to read the entire image of the original document. The original image is read one line at a time by the CCD line sensor 2, and red (R), green (G), and blue (B) color signals are outputted as indicative of red, green, and blue components of the original image.

The ROM 92 is a non-rewritable memory. The ROM 92 stores therein a control program executed by the CPU 91, and fixed values. For example, the ROM 92 stores therein an image read processing program shown in FIG. 6 as a part of the control program.

The RAM 93 is a rewritable volatile memory for temporarily storing various kinds of data. A buffer is provided in the RAM 93 for temporarily storing a plurality of sets of digital RGB data (image data) that are supplied from the A/D conversion circuit 3 and that are indicative of the original image. The RGB data sets held in this buffer is subjected to various kinds of correction by the image read processing of FIG. 6. The corrected RGB data sets are written into the line buffer 94 as values in any of 256 levels according to the respective signal strengths, with "FFH" as the maximum strength and "00H" as the minimum strength. After the RGB data sets are written to the line buffer 94, the RGB data sets are deleted from the RAM 93 buffer.

The line buffer 94 is a memory for storing the RGB data sets corrected by the image read processing of FIG. 6.

It is noted that the CCD line sensor 2 reads a large quantity of RGB data sets. Because the original image is read one line at a time by the CCD line sensor 2, it takes a long period of time to read RGB data sets for all the pixels in the original image. If a series of processes for converting RGB data sets into print data sets were executed using the RAM 93 only, a too large amount of operating area will be used in the RAM 93. Considering this potential problem, the line buffer 94 is provided separately from the RAM 93 to store the RGB data sets which have been corrected by the image read processing of FIG. 6, thereby securing the capacity of the RAM 93. After the RGB data sets are stored in the line buffer 94, the RGB data sets are deleted from the RAM 93. Accordingly, the image data processing and other processing can be efficiently executed by the CPU 91 by using the RAM 93.

After the RGB data sets corrected by the image read processing of FIG. 6 are stored in the line buffer 94, the RGB data sets are then read sequentially from the line buffer 94 into the RGB data conversion circuit 95, where the RGB data sets are converted into print data.

The RGB data conversion circuit 95 is for converting the corrected RGB data sets into print data sets (C', M', Ye', K1) or (K2).

As stated above, printing by the color copier 1 is carried out using an ink-jet method. With the ink-jet method, full-color image printing is performed by superimposing cyan, magenta, yellow, and black inks. Therefore, color indicated by R, G, and B data has to be reproduced by mixing the inks of cyan, magenta, yellow, and black. The circuit 95 first converts each RGB data set into a CMYe data set by using a direct map. The direct map shows the correspondence between a plurality of possible RGB data sets and a plurality of CMYE data sets. The circuit 95 then converts each CMYe data set into either a set of K data (K2) or a set of C'M'Ye'K data (C', M', Ye', K1) during a black generation processing (S15: see FIG. 8) as will be described later.

The RGB data conversion circuit 95 executes an RGB data conversion processing (FIG. 7). The circuit 95 is constructed from a gate array or an ASIC. Although not shown in the drawings, the RGB data conversion circuit 95 includes several circuits including: a black generation circuit (under color removal circuit (UCR)); an image smoothing and edge enhancement circuit; a recording γ processing circuit; and a binarization circuit. The black generation circuit (UCR) is a gate array or an ASIC for performing the black generation processing (S15). The image smoothing and edge enhancement circuit is for performing a smoothing and edge enhancement processing (S12). The recording γ processing circuit is for executing a recording γ processing (S16) to correct the print characteristics of the C'M'Ye'K or K print data dependently on a γ curve. The binarization circuit is for executing a binarization processing (517) to perform halftone processing.

The gate array 96 receives a print timing signal from the CPU 91 and print data (dot-forming data or non-dot forming data) from the RGB data conversion, circuit 95. The gate array 96 is for outputting a drive signal, a transfer clock, a latch signal, a parameter signal, and an ejection timing signal based on the print timing signal and the print data (dot-forming data or non-dot forming data). The drive signal is used for printing the print data on the recording paper. The transfer clock is synchronized with the drive signal. The parameter signal is used for generating a basic print waveform signal. The ejection timing signal is outputted in a fixed cycle. These signals are transferred to the carriage board 120, on which a head driver is mounted Although not shown in the drawing, a head driver (drive circuit) is mounted on the carriage board 120. The head driver is for driving the ink-jet head 130. The ink-jet head 130 and the head driver are connected with each other by a flexible wiring sheet. The flexible wiring sheet includes a polyimide film with a thickness of 50 to 150 microns, on which a copper foil wiring pattern is formed. The head driver on the carriage board 120 is controlled via the gate array 96 on the main-unit-side control board 100, and applies each drive element in the ink jet head 130 with drive pulses of a waveform that matches a recording mode employed. As a result, a desired quantity of ink is ejected from the ink-jet head 130.

It is noted that the CPU 91, ROM 92, RAM 93, line buffer 94, RGS data conversion circuit 95, and gate array 96, are connected via a bus line 99. Signals communicated between the carriage board 120 and the gate array 96 are transferred via a harness cable connecting the carriage board 120 and the gate array 96.

In this example, the CCD line sensor 2 is oriented relative to the original document so that the COD line sensor 2 extends parallel to the Y direction and is scanned in the X direction. The X and Y directions are perpendicular to each other. In the CCD line sensor 2, the R-line sensor unit, the G-line sensor unit, and the B-line sensor unit are arranged along the X direction with the predetermined gaps therebetween. In each of the R-, G-, and B-line sensor units, a plurality of CCD elements are arranged along the Y direction. While the CCD line sensor 2 moves in the X direction relative to the original document, the CCD line sensor 2 reads the original image one line by one line. Each CCD element generates an analog signal indicative of the amount of light of a corresponding component that the subject CCD element receives from a portion of the original image where the CCD element confronts. The analog-to-digital converter 3 receives the analog signal from each CCD element for each color, and converts the analog signal into eight-bit digital data of the corresponding component.

According to the present embodiment, a black character detection circuit 95a is provided within the RGB data conversion circuit 95. The black character detection circuit 95a is for preventing decrease in the definition or clearness of black characters that occurs due to the CCD line sensor 2.

It is noted that black characters have many fine-line parts and many edge parts.

The definition of the black characters decreases when color misalignment occurs in fine-line parts and edge parts of the black characters.

More specifically, in the CCD line sensor 2, there are gaps of several lines between the R-, G-, and B-line sensor units. Therefore, the R-, G-, and B-line sensor units read different lines on the original document simultaneously. It is necessary to use, as signals indicative of each line on the original image, analog signals that have been outputted from the R-, G-, and B-line sensor units at different timings when the respective sensor units confront the same line on the original image.

If, however, the feeding precision of the CCD line sensor 2 is improper, the CPU 91 will erroneously use, as signals for the same line, those analog signals that have been produced for different lines. As a result, color misalignment occurs and ink bleeding occurs.

Especially when such color bleeding occurs at the periphery of a fine line of a black character or at an edge of the black character, the definition of the black character is decreased.

It is now assumed that an original image has a black character printed on a white background. The black character has a solid black area that extends from the position X3 to the right thereof along the X direction. Accordingly, the black character has an edge (black-to-white boundary) at a location between the positions X2 and X3. The edge of the black character extends parallel to the Y direction in a range including the positions Y1 to Y5. When the CCD line sensor 2 moves relative to this original image to scan the position X1 to the position X5, strengths of the red, green, and blue components of light reflected from the image should change from their maximum levels to the minimum levels at the same positions between X2 and X3, in order to correctly indicate the density distribution of the original image.

If, however, the feeding precision of the CCD line sensor 2 is improper, reading of the R-, G-, and B-line sensor units are not performed for the same line positions, but are shifted from one another in the X direction. In such a case, when the CCD line sensor 2 scans the position X1 to the position X5, red, green, and blue components of light reflected from different line positions will be erroneously recognized as for the same line position. Accordingly, strengths of the red, green, and blue components of the reflected light will be erroneously detected as changing from their maximum levels to the minimum levels at different positions in the X direction as shown in FIG. 3A. As a result, the CCD elements in the R-, G-, and B-line sensor units generate analog signals, whose strengths change in the same manner as shown in FIG. 3A. It is noted that because the edge extends at least from Y1 to Y5, the CCD elements at the respective Y1-Y5 positions generate analog signals that change in the same manner as shown in FIG. 3A.

Figure 3B:
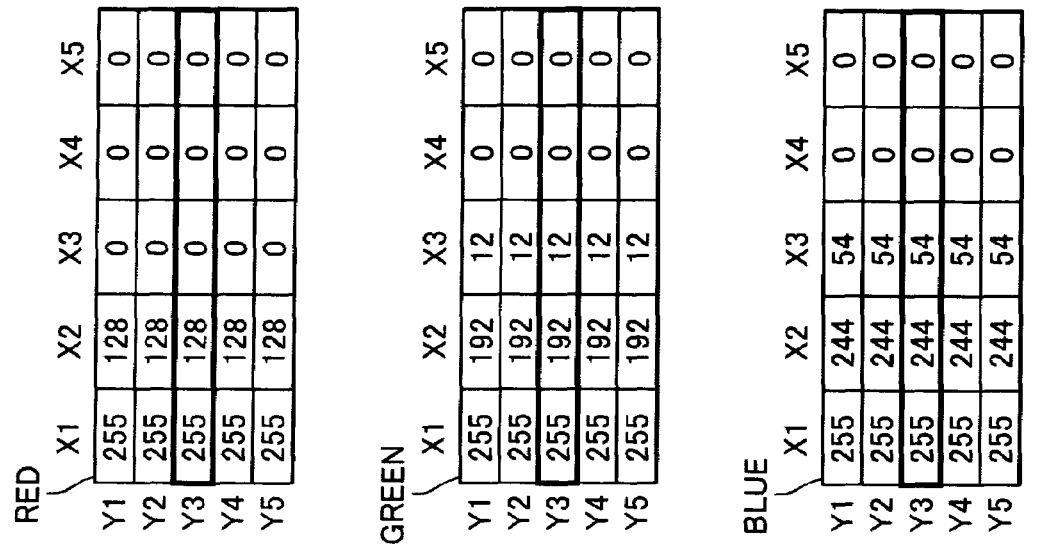
FIG. 3B illustrates how R, G, and B digital data is obtained for X-coordinates X1-X5 and Y-coordinates Y1-Y5 based on R, G, and B analog color signals indicative of the light intensities of FIG. 3A.
Figure 3A:
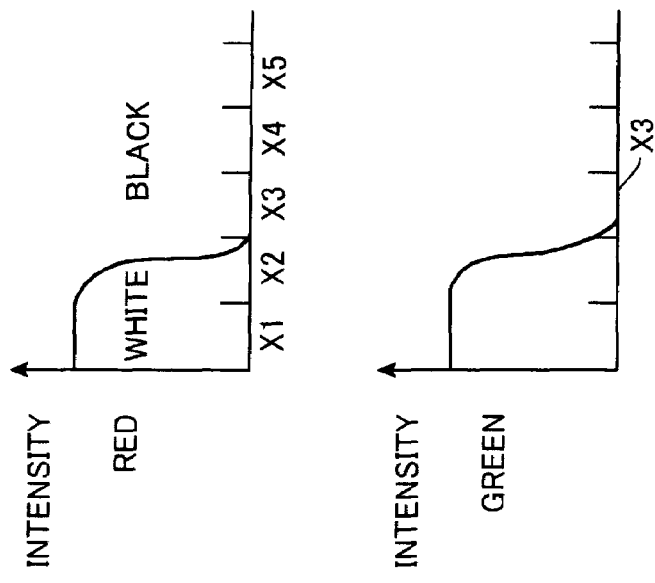
FIG. 3A illustrates how intensity of R, G, and B color components of light reflected from an edge part of a black character is detected for X-coordinates X1-X5 when the feeding precision of a CCD line sensor is improper.

When the analog signals shown in FIG. 3A are processed by the analog-to-digital converter 3, the analog-to-digital converter 3 outputs: 8-bit digital values of "255h", "128h", "00h, "00h", and 00h" as red data for the X-positions X1 to X5; 8-bit digital values of "255h", "192h", "12h", "00h", and "00h" as green data for the X-positions X1 to X5; and 8-bit digital values of "255h", "244h", "54h", "00h", and "00h" as blue data for the x-positions X1 to X5 as shown in FIG. 3B.

Because the edge is located between the X-coordinates X2 and X3 on the original image, R data, G data, and B data should drastically change from the X-coordinate of X2 to the X-coordinate of X3. The strengths of the R data, G data, and B data should be "00h" at the location X3 to represent black color.

As apparent from FIGS. 3A and 3B, all of the R data, S data, and B data levels change drastically in the vicinity of the X-coordinate of (X3). Such a change properly indicates that pixels in the vicinity of X-coordinates (X3) are at an edge of a black area. However, strengths of R data, G data, and B data differ at the X-coordinate position (X3). That is, R data at X3 is "00h", G data at X3 is "12h", and B data at X3 is "54h". In other words, the CCD line sensor 2 detects the pixels at the X-coordinate X3 as not being black but as being some chromatic color. This is because reading of the respective color components is not performed for the same pixels, but is shifted from one another in the x direction and color misalignment occurs. When such R, G, and S data is converted to print data in such circumstances, ink bleeding will occur at the edge. However, according to the present embodiment, the black character detection circuit 95a can eliminate such a color misalignment by detecting pixels in edge parts of black characters and by performing black density correction onto the edge parts. Accordingly, the definition of black characters is not decreased.

It is also assumed that an original image has a black character printed on a white background. The black character has a fine-line portion at a position of X3 in the X direction. The fine line extends parallel to the Y direction in a range including the positions Y1 to Y5. When the CCD line sensor 2 moves relative to this original image to scan the position X1 to the position X5, strengths of the red, green, and blue components of light reflected from the image should change from their maximum levels to the minimum levels and then back to the maximum levels at the same position X3 in order to correctly indicate the density distribution of the original image.

Figures 3C, 3D:
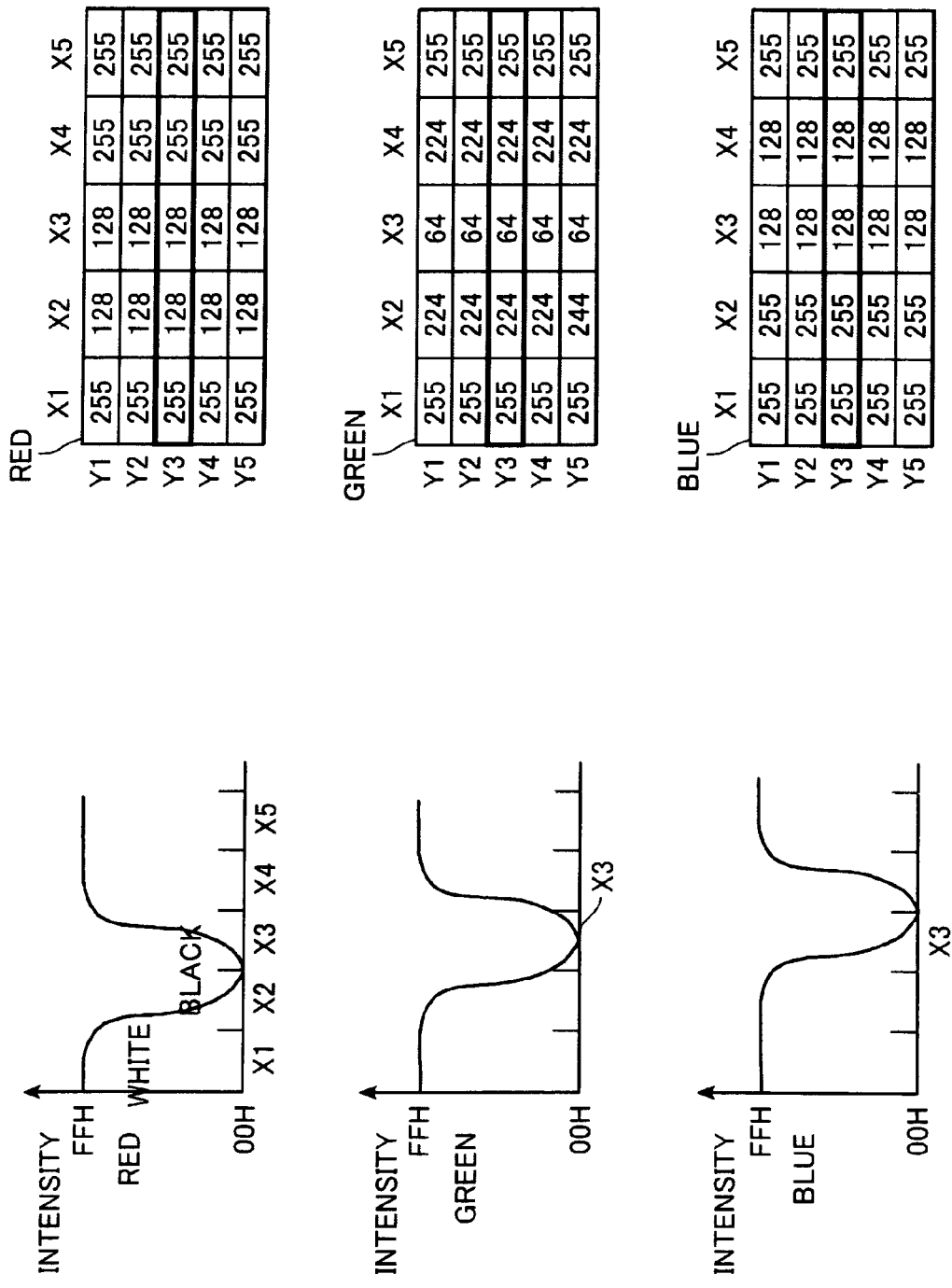
FIG. 3C illustrates how intensity of R, G, and B color components of light reflected from an fine-line part of a black character is detected for X-coordinates X1-X5 when the feeding precision of a CCD line sensor is improper.
FIG. 3D illustrates how R, G, and B digital data is obtained for X-coordinates X1-X5 and Y-coordinates Y1-Y5 based on R, G, and B analog color signals indicative of the light intensities of FIG. 3C.

If, however, the feeding precision of the CCD line sensor 2 is improper, reading of the R-, G-, and B-line sensor units are not performed for the same line positions, but are shifted from one another in the X direction. In such a case, when the CCD line sensor 2 scans the position X1 to the position X5, red, green, and blue components of light reflected from different line positions will be erroneously recognized as for the same line position. Accordingly, strengths of the red, green, and blue components of the reflected light will be erroneously detected as changing from their maximum levels to the minimum levels and then back to the maximum levels at different positions in the X direction as shown in FIG. 3C. As a result, the CCD elements in the R-, G-, and B-line sensor units generate analog signals, whose strengths change in the same manner as shown in FIG. 3C. It is noted that because the fine line extends at least from Y1 to Y5, the CCD elements at the respective Y1-Y5 positions generate analog signals that change in the same manner as shown in FIG. 3C.

When the analog signals shown in FIG. 3C are processed by the analog-to-digital converter 3, the analog-to-digital converter 3 outputs: 8-bit digital values of "255h", "128h", "128h", "255h", and "255h" as red data for the X-positions X1 to X5; 8-bit digital values of "255h", "224h", "64h", "224h", and "255h" as green data for the X-positions X1 to X5; and 8-bit digital values of "255h", "255h", "128h", "128h", and "255h" as blue data for the K-positions X1 to X5 as shown in FIG. 3D.

Because the black line is located at the X-coordinate (X3) on the original image, R data, G data, and B data at X-coordinate of X3 should b equal to "00h". As apparent from FIGS. 3C and 3D, signal strength is low at the X-coordinate (X3), and signal strength is high at coordinates X1 and X5 on either side of X-coordinate (X3). This properly indicates that the pixels at X-coordinate (X3) are pixels of a fine-line part.

However, as shown in FIG. 3D, though the G data value is at the minimum at X-coordinate (X3), the R data is at the minimum at X-coordinates (X2) and (X3), and the B data is at the minimum at X-coordinates (X3) and (X4). This is because reading of each color component is not performed for the same pixels, but is shifted from one another in the X direction, and color misalignment occurs. When such R, G, and B data is converted to print data in such circumstances, ink bleeding will occur at the edges of the black fine lines, However, according to the present embodiment, the black character detection circuit 95a can eliminate also such a color misalignment by detecting pixels in fine-line parts of black characters and by performing black density correction onto the fine-line parts. Accordingly, the definition of black characters is not decreased.

Additionally, the minimum signal strengths for red, green, and blue are equal to "128h", "64h" and "128h", but are not equal to "00h". This indicates that, due to the influence from adjacent white areas, the CCD element outputs analog signals with strength higher than "00h", even when the CCD element confronts the black fire line portion. In this way, pixels of fine-line parts in black characters are read as of a lighter color than its actual color, causing a decrease in the definition of the black character. However, according to the present embodiment, the black character detection circuit 95a can eliminate such a color misalignment by detecting pixels in fine-line parts of black characters and by performing black density correction onto the fine-line parts. Accordingly, the definition of black characters is not decreased.

Next will be given a detailed description of the black character detection circuit 95a.

The black character detection circuit 95a is a circuit (gate array circuit or ASIC circuit) for performing black character detection processing (S11 shown in FIG. 9). By executing the black character detection process, the black character detection circuit 95a detects black characters in the read image. When some pixel is determined to be located within a black character, the circuit 95a adds data of the subject pixel with a black code indicating that the subject pixel is a black character pixel.

As shown in FIG. 4, the black character detection circuit 95a includes: a YIQ conversion circuit 95b, a fine line detection circuit 95c, an edge detection circuit 95d, an achromatic area judgment circuit 95e, and a black character determination circuit 95f.

The YIQ conversion circuit 95b is for performing a RGB to YIQ conversion processing (S21 and S22 in FIG. 9). By executing the RGB to YIQ conversion processing, the circuit 95b converts a set of RGB data (R, G. B), read from the line buffer 94 for each pixel of the read image, into a set of YTQ data (Y. I, Q) that includes a brightness component (Y) and chroma components (I, Q). Brightness (Y) is data that indicates the intensity of the read, pixel image. The smaller the value of Y, the greater the density, that is, the nearer the density is to black. The chroma components (I, Q) are data represented by two components: I component and Q component. The greater the absolute values of I and Q the greater the color hue (chromaticity). In this way, the YIQ data set (Y, I, Q) indicates the degree how the original RGB data (R, G, B) is achromatic.

The YIQ conversion circuit 95b converts an RGB data set (R, G, B) into a YIQ data set (Y, I, Q) by using the following equations (1):

$$Y = 0.3 \times R + 0.59 \times G + 0.11 \times B$$

$$I = R - Y$$

$$Q = B - Y \tag{1}$$

It is noted that the YIQ conversion circuit 95b receives RGB date sets (R, C, B) for all the pixels in the read image, and converts each RGB data set into a YIQ data set.

The YIQ conversion circuit 95b outputs the resultant YIQ data sets (Y, I, Q) into each of: the fine line detection circuit 95c, the edge detection circuit 95d, and the achromatic area judgment circuit 95e.

It is noted that the smoothing and edge enhancement circuit (not shown) provided in the RGB data conversion circuit 95 executes smoothing and edge enhancement processing (S12 in FIG. 7) based on the YIQ data sets. Accordingly, the YIQ conversion circuit 95b outputs the YIQ data sets also to the smoothing and edge enhancement circuit in the RGB data conversion circuit 95.

The edge detection circuit 95*d* executes edge detection processing (S24 in FIG. 9) to detect edges (that is, positions where the brightness (Y) sharply changes) in the read image.

The circuit 95*d* executes edge detection using only the brightness (Y) data from among the YIQ data Y, I, and Q. The circuit 95*d* subjects all the pixels in the read image to the edge detection.

The edge detection circuit 95*d* uses the pair of Sobel filters SF1 and SF2 shown in FIG. 5A to execute edge detection to judge whether or not each pixel in the read image is an edge pixel. Each Sobel filter SF1, SF2 is a table, which lists up weight coefficient to be multiplied to brightness (Y) data of eight adjacent pixels that are located surrounding a subject pixel (x, y) subjected to the edge detection operation. More specifically, the Sobel filter SF1 lists up weight coefficients to be multiplied to brightness (Y) data of six adjacent pixels that are located adjacent to the subject pixel (X, Y) in the X direction of the original image, while the other Sobel filter SF2 lists up weight coefficients to be multiplied to brightness (Y) data of six adjacent pixels that are located adjacent to the subject pixel (X, Y) in the Y direction of the original image. When the edge detection circuit 95*d* determines that the subject pixel is an edge pixel, the circuit 95*d* adds an edge code to the YIQ data set for the subject pixel. The edge code indicates that the subject pixel is an edge-part pixel.

During the edge detection operation, the circuit 95*d* first sets, for the subject pixel (x, y), a 3×3 matrix area that is centered on the subject pixel (x, y) The 3×3 matrix area therefore includes: eight adjacent pixels at coordinates of (x−1, y−1), (x, y−1), (x+1, y−1), (x−1, y), (x, y), (x+1, y), (x−1, y+1), (x, y+1), and (x+1, y+1) Then, the circuit 95*d* calculates the following formula (2) to determine an edge amount g(x,y) for the subject pixel (x, y) by using the brightness (Y) data at these adjacent pixels and the Sobel filters SF1 and SF2.

$$g(x, y) = \{(\Delta x)^2 + (\Delta y)^2\}^{1/2}, \quad (2)$$

wherein $$\Delta x = ((-1)*Y(x-1, y-1)) + ((-2)*Y(x-1, y)) +$$
$$((-1)*Y(x-1, y+1)) + ((1)*Y(x+1, y-1)) +$$
$$((2)*Y(x+1, y)) + ((1)*Y(x+1, y+1)),$$
$$\text{and } \Delta y = ((-1)*Y(x-1, y-1)) + ((-2)*Y(x, y-1)) +$$
$$((-1)*Y(x+1, y-1)) + ((1)*Y(x-1, y+1)) +$$
$$((2)*Y(x, y+1)) + ((1)*Y(x+1, y+1)).$$

Then, the circuit 95*d* compares the value of g(x,y) with a predetermined threshold value. When the value of g(x, y) is greater than the threshold value, the circuit 95*d* determines that the pixel (x, y) is a part of an edge. When the value of g(x, y) is equal to or smaller than the threshold value, the circuit 95*d* determines that the pixel (x, y) is not a part of an edge. When the pixel (x, y) is determined as a part of an edge, the circuit 95*d* adds an edge code to the YIQ data set for the pixel (x, y).

For example, Y data for pixels (X1, Y1) to (X3, Y3) are as shown in FIG. 5B in the read image. In this case, in order to judge whether or not the pixel (X2, Y2), centered on the 3×3 matrix, is in an edge part, the circuit 95*d* calculates an edge amount g(X2, Y2) as indicated below:

$$g(X2, Y2) = \{(\Delta X2)^2 + (\Delta Y2)^2\}^{1/2}$$

wherein $$\Delta X2 = ((-1)*100) + ((-2)*120) +$$
$$((-1)*130) + ((1)*170) + ((2)*180) + ((1)*190); \text{ and}$$
$$\Delta Y2 = ((-1)*100) + ((-2)*140) + ((-1)*170) +$$
$$((1)*130) + ((2)*160) + ((1)*190).$$

It is noted that the edge detection circuit 95*d* may not detect a one-dot fine line as an edge. That is, even if some pixel (x, y) is in a one-dot fine line, the edge amount g(x,y) will be calculated as being equal to "0" and therefore the circuit 95*d* will determine that the pixel (x, y) is not a part of an edge part.

The fine line detection circuit 95*c* is for executing fine line detection processing (S23 in FIG. 9) to detect fine line parts in the read image.

According to the present embodiment, the fine line detection circuit 95*c* is configured so as to be capable of detecting a one-dot fine line that is difficult to detect by the edge detection circuit 95*d*. The fine line detection circuit 95*c* executes fine line detection using only the brightness (Y) data from among the YIQ data Y, I, and Q.

The fine line detection circuit 95*c* subjects all the pixels in the read image to the fine line detection.

When one pixel (fine-line pixel (X3, Y3) in FIG. 13) is subjected to the fine-line detection as a subject pixel 17, the circuit 95*c* performs fine-line detection as described below.

First, the circuit 95*c* sets up a 3×3 matrix area, centered on the subject pixel 17, as a subject pixel area 18 as shown in FIG. 13. The thus set 3×3 matrix area 18 is composed of a total of nine pixels, in three rows and three columns.

Then, the circuit 95*c* assigns a point value in a range of 0 to 8 to each pixel in the 3×3 matrix area 18. A median point value "4" is assigned to the subject pixel 17. The minimum point value of each row is assigned to the pixel that is located at the left end of the corresponding row and that has the smallest coordinate value in the corresponding row. Point values are assigned so as to increase in the amounts from the top row to the bottom row. By setting the point values in this way, it is ensured that the sum of the point values of any three pixels that include the subject pixel and that are aligned vertically, horizontally, or diagonally in the 3×3 matrix area, is equal to "12".

Then, the circuit 95*c* extracts three pixels 22 in order from the 3×3 matrix area 18. That is, the circuit 95*c* first extracts the pixel with the smallest brightness (Y) value, then extracts the pixel with the second smallest brightness (Y) value, and then extracts the pixel with the third smallest brightness (Y) value.

The circuit 95*c* calculates the total amount of the point values of the three extracted pixels 22. If the total amount is equal to "12", this indicates that the three extracted pixels 22 include the subject pixel 17 in their center location and the subject pixel 17 and the remaining two pixels are aligned vertically, horizontally, or diagonally. Thus, it is known that the three pixels 22 are connected because the three pixels are aligned vertically, horizontally, or diagonally.

It is noted that if the subject pixel 17 is a pixel of a fine-line part, the above-described three pixels including the subject pixel 17 are in a connected state. However, pixels in a connected state are not necessarily fine-line part pixels, but are often pixels indicative of a halftone image. Therefore, in order to detect only fine-line part pixels, the circuit 95c next performs an operation to verify to what degree there is a significant difference between the density of the three extracted pixels 22 and that of the non-extracted pixels in a manner described below.

The circuit 95c executes this verification by first calculating an intermediate value between the minimum and maximum brightness (Y) values of the pixels in the 3×3 matrix area 18. Then, the circuit 95c counts the number of pixels 23 whose brightness is smaller than the intermediate value. If the number of the darker pixels 23 is three or less, the circuit 95c determines that the subject pixel 17 is a fine-line part pixel. On the other hand, if the number of the darker pixels 23 is four or more, the circuit 95c determines that the subject pixel 17 is not a fine-line part pixel.

When the circuit 95c determines that the subject pixel 17 is a fine-line part pixel, the circuit 95c adds a fine-line code to the YIQ data set of the subject pixel 17. The fine-line code indicates that the subject pixel 17 is a fine-line part pixel. In this way, the circuit 95c can detect a one-dot fine-line that cannot be detected by the edge detection circuit 95d.

It is noted that characters are often composed of fine lines and have many edges. Therefore, according to the present embodiment, pixels detected as fine-line pixels by the fine line detection circuit 95c and pixels detected as edge pixels by the edge detection circuit 95d are determined as character-area pixels that are located in a part of some character even though the pixels are not actually any parts of characters, that is, even though the pixels are simple fine lines or edges that do not constitute any characters.

The achromatic area judgment circuit 95e is for executing achromatic area judgment processing (S27 through S30 in FIG. 9). By executing the achromatic area Judgment processing, the achromatic area judgment circuit 95e judges whether or not each character-area pixel is achromatic based on YIQ data.

As described above, according to the present embodiment, if some pixel is detected as being in an edge part or a fine-line part, even if the pixel is actually not in any character part, the pixel is determined as a character-area pixel. The achromatic area judgment circuit 95e therefore executes the achromatic area judgment operation onto the character-area pixels regardless of whether the character-area pixels are actually in some character part or not. It is noted that image definition will decrease when color bleeding occurs in an achromatic fine-line part or edge part, as well as when color bleeding occurs in achromatic characters. By executing the achromatic area judgment operation not only to characters but also to other fine-line parts or edge parts, it is possible to improve the entire image definition.

More specifically, the achromatic area judgment circuit 95e subjects all the character-area pixels (all the fine-line pixels and all the edge pixels) in the read image to the achromatic area judgment. When one pixel (edge pixel (X3, Y3) in FIG. 10, or fine-line pixel (X3, Y3) in FIG. 11) is subjected to the achromatic area judgment as a subject pixel 17, the circuit 95e performs achromatic area judgment as described below.

First, the achromatic area judgment circuit 95e sets up a 3×3 subject area 18 that is centered on the subject pixel 17. The circuit 95e extracts, as a judgment pixel 19, a pixel with the lowest brightness in the 3×3 subject area 18. The circuit 95e then sets up a 3×3 judgment area 20 that is centered on the judgment pixel 19.

Then, the circuit 95e determines that the subject pixel 17 is achromatic if the absolute value of the average of the chroma component I in the judgment area 20 is less than a first predetermined threshold T1 and the absolute value of the average of the chroma component Q in the judgment area 20 is less than a second predetermined threshold T2. It is noted that each of the first and second thresholds T1 and T2 is such a value as 15 or 16, for example.

The circuit 95e determines that the subject pixel 17 is chromatic if the absolute value of the average of the chroma component I in the judgment area 20 is greater than or equal to the threshold T1 or the absolute value of the average of the chroma component Q in the judgment area 20 is greater than or equal to the threshold T2.

It is noted that when the subject pixel 17 is determined as achromatic by the circuit 95e, it is known that the subject pixel 17 has no chroma and therefore the color of the subject pixel 17 is located on an achromatic axis that extends from black through gray to white.

The black character determination circuit 95f is for performing a black character determination (S31 in FIG. 9). More specifically, when some pixel, which has been judged as a character-area pixel according to the judgment results of the fine line detection circuit 95c or the edge detection circuit 95d, is judged to be achromatic by the achromatic area judgment circuit 95e, the black character determination circuit 95f determines that the character-area pixel is a black-character pixel that constitutes a part of a black character.

It is noted that when the character-area pixel is judged as being achromatic by the circuit 95e, the pixel may be either black, gray, or white. However, the black character determination circuit 95f automatically determines the achromatic character-area pixels as black-character pixels regardless of whether the achromatic character-area pixels are black, gray, or white.

In this way, the black character detection circuit 95a determines, as black-character pixels, not only those pixels that actually constitute part of black characters but also other pixels including: pixels constituting part of gray or white characters, pixels constituting black, gray, or white fine-lines other than parts of characters, and pixels constituting black, gray, or white edges other than parts of characters.

The black character determination circuit 95f then adds a black code to the YIQ data set for the black-character pixel. The black code indicates that the subject pixel is a black-character pixel and therefore that the subject pixel should be printed with black ink only.

For example, if one set of YIQ data, to which a fine-line code has been added by the fine line detection circuit 95c, is judged to be achromatic by the operation of the achromatic area judgment circuit 95e, a black code is added to the YIQ data set by the black character determination circuit 95f.

Figure 8:
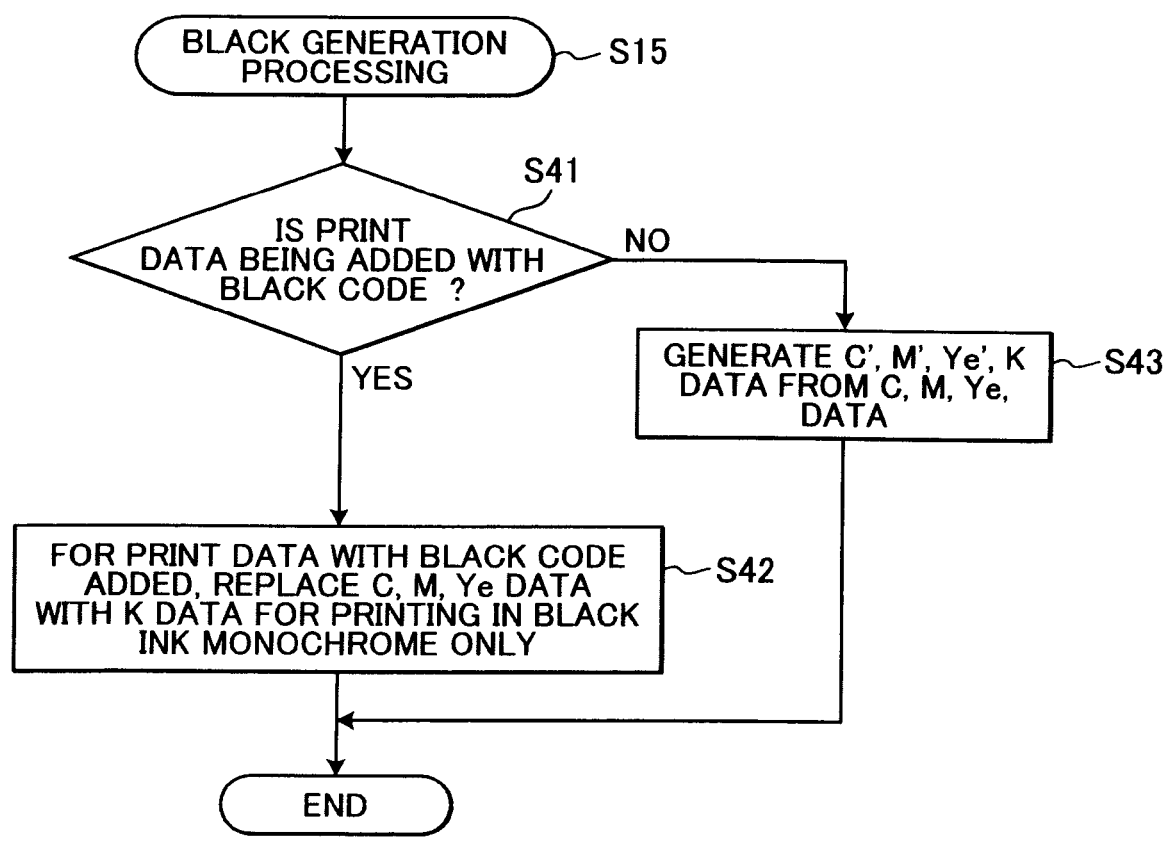

It is noted that for a pixel having the YIQ data with a black code, the black generation circuit in the circuit 95 will generate, in S15 in FIG. 8, K data that specifies printing in black monochrome ink only. Accordingly, it is ensured that black character pixels are printed in black.

Even if the CCD line sensor 2 reads black fine-line pixels as pixels of lighter densities than the original black densities, the black fine-line part pixels will be printed as completely black, and the contrast of the fine-line images can be improved. Even if color misalignment occurs by the CCD line sensor 2 in black edge parts or black fine-line parts, it is still possible to prevent color bleeding from occurring in resultant print images, and to output well-defined black images. Gray and white characters, black, gray, and white fine lines, and black, gray, and white edges will also be printed by black ink only, and therefore will be reproduced accurately at a proper, not lighter density, and without suffering from any color bleeding.

With the above-described configuration, the color copier 1 of the present embodiment operates as described below.

When the CCD line sensor 2 reads an original image and outputs analog signals for red, green, and blue components for each pixel, the analog signals are converted by the A/D converter 3 into a set of digital RGB data (R, G, B) for the subject pixel. The resultant RGB data set (R, G, B) is temporarily stored in the RAM 93. On the main-unit-side control board 100, the RGB data set for each pixel is read from the RAM 93, and is subjected to an image reading process of FIG. 6.

During the Image reading processing, the RGB data set for each pixel is corrected as described below.

A black correction (dark correction) is first executed in S1. Accordingly, the black level of the R, G, and B data is corrected.

Next, in S2, shading correction processing is executed onto the RGB data set for each pixel.

Then, in S3, a read γ processing is executed onto the RGP data set for each pixel to compensate for the y characteristics of the CCD line sensor 2.

In this way, the RGB data (R, G, S) is corrected based on the characteristics of the reading optical system. The RGB data (R, G, B) that has undergone by processings S1 through S3 is then written to the line buffer 94 in S4, and the image read processing ends.

The RGB data conversion circuit 95 executes RGB data conversion processing of FIG. 7 onto a RGB data set for each pixel, that is now stored in the line buffer 94, and converts the RGB data set (R, G, B) into a set of C'M'Ye'K print data or a set of K print data.

During the RGB data conversion processing, first, in S11, the black character detection circuit 95a retrieves RGB data sets (R, G, B) for all the pixels from the line, buffer 94, and executes a black character detection processing onto the RGB data sets. The black character detection circuit 95a judges whether or not each pixel in the image is a black character pixel, thereby extracting black-character pixels from the image, and adds black codes to the black-character pixels.

More specifically, as shown in FIG. 9, first, the YIQ conversion circuit 95b executes a YIQ conversion processing (S21 and S22) to convert RGB data (R, G, B) for all the pixels into YIQ data (Y, I, Q).

Next, the fine line detection circuit 95c executes a fine line detection processing (S23) to judge whether or not each pixel in the image is a fine-line pixel. The circuit 95c adds a fine-line code to a YIQ data set for each pixel that is judged as being a fine-line pixel.

It is noted that although the YIQ data set (Y, I, Q) is composed of three kinds of data Y, I, and Q, the YIQ data set (Y, I, Q) functions as one set of pixel data including these three kinds of data. Therefore, a single fine-line code is added to the set of YIQ data for one pixel.

Then, the edge detection circuit 95d executes an edge detection processing (S24) to judge whether or not each pixel in the image is an edge pixel. The circuit 95d adds an edge code to a YIQ data set for each pixel that is judged as being an edge pixel.

Next, in S25, the fine-line pixels and the edge pixels are determined as character-area pixels that constitute a part of some character, even if those pixels are not in part of any characters actually.

Next, in S26 to S32, the achromatic area judgment circuit 95e and the black character determination circuit 95f are operated to extract black-character pixels among the character-area pixels, and to add black codes to the black-character pixels.

More specifically, the circuit 95e executes an achromatic area detection processing (S26 through S30) to judge whether or not each character-area pixel (each fine line pixel and each edge pixel) is achromatic. When a character-area pixel is determined as achromatic, it is known that the character-pixel is a black-character pixel that constitutes a part of a black character. Accordingly, the black character determination circuit 95f executes a black character determination processing (S31) to add a black code to the YIQ data for such a black-character pixel.

It is noted that when the black code is added to the YIQ data for each black-character pixel in S11, this black code will not be cleared, but will remain being added to data for the subject pixel even when YIQ data is converted into RGB data in S13 (FIG. 7), and further converted into CMYe print data in 514 to be described later. It is therefore assured that K data for designating print in black monochromatic ink will be generated for those black-character pixels during the black generation processing (S15) to be described later.

After black-character pixels are determined among all the pixels in the image and are added with black codes in S11, the process proceeds to S12, in which smoothing and edge enhancement processing is executed. In S12, the YIQ data for all the pixels in the image is subjected to a smoothing process and an edge enhancement process.

Next, in S13, a YIQ-RGB conversion processing is executed to convert YIQ data sets for all the pixels, which have been processed in S12, back into RGB data sets.

In S14, a color conversion processing is executed to convert a set of RGB data obtained in S13 for each pixel into a set of CMYe data by using the direct map. The "direct map" is a table showing the correspondence between a plurality of RGB data sets (R, G, B), which-are defined on the reading-device color system, and a plurality of CMYe data sets (C, M, Ye), which are defined on the printing-device color system.

Next, in S15, black generation processing is executed. During the black generation processing, a set of chromatic print data (C', M', Ye', K1) or a set of achromatic print data (K2) is generated based on the CMYe data (C, M, Ye), which has been obtained in S14 for each pixel. That is, if a set of CMYe data (C, M, Ye) for one pixel is being added with no black code, the CMYe data set is replaced by a set of C'M'Ye'K data (C', M', Ye', K1). If a set of CMYe data for one pixel is being added with a black code, the CMYe data set is replaced by a set of K data (K2).

The set of chromatic print data (C', M', Ye', K1) specifies the ejection quantities of cyan (C'), magenta (M'), yellow (Ye'), and black (K1) to generate chromatic color. The set of achromatic print data (K2) specifies the ejection quantity of black (K2) to generate achromatic color by the black monochromatic ink, only.

In S16, recording γ processing is executed onto the C'M'Ye'K data (C', M', Ye', K1) or K data (K2), which has been obtained in S15 for each pixel, in order to perform y correction of color characteristics of the respective inks of cyan (C'), magenta (M'), yellow (Ye'), and black (K1 or K2). Thus, C'M'Ye'K data (C', M', Ye', K1) or K data (K2) for each pixel is corrected based on the print color characteristics.

Next, in S17, a binarization processing is executed onto the C'M'Ye'K data (C', M', Ye', K1) or K data (K2) for each pixel. The binarization processing employs a halftone processing by using an error diffusion method or a dithering method. During the binarization processing, each data C', M', Ye', K1 constituting the C'M'Ye'K data set (C', M', Ye', K1) or data K2 constituting the K data set (K2) is compared with a predetermined threshold, and is converted into dot-forming data or non-dot forming data according to the comparison result. The dot-forming data indicates that the corresponding color ink should be ejected to form a corresponding color dot, while the non-dot forming data indicates that the corresponding color ink should not be ejected to form no dot.

Next, in S18, the dot-forming data or non-dot forming data (binarized C'M'Ye'K data (C', M', Ye', K1) or binarized K data (K2)) for each pixel is transmitted to the gate array 96. Then, this RGB data conversion processing ends.

Next, the black generation processing (S15) will be described in greater detail with reference to FIG. 8.

The black generation processing (S15) is executed by the black generation circuit (UCR) provided in the RGB data conversion circuit 95.

During the black generation processing (Sl5), the flow of processes shown in FIG. 8 is executed repeatedly for all the pixels in the image.

For each pixel, it is first judged in S41 whether or not a set of CMYe print data for the subject pixel is being added with a black code. If CMYE data for that pixel is being added with a black code (S41; Yes), the process proceeds to S42, in which the CMYe data for the subject pixel is replaced by a set of K print data (K2) indicative of printing in black ink monochrome only.

On the other hand, if the CMYe print data for the subject pixel is being added with no black code (S41: No), the program proceeds to S43, wherein a set of C'M'Ye'K print data (C', M', Ye', K1) is generated for the subject pixel based on the original CMYe print data. More specifically, K data (K1) is first generated based on the C, M, and Ye data in the original CMYe print data. Then, C' data, M' data, and Ye' data are generated by subtracting the value of K data (K1) (black component) from the values of the original C, M, and Ye data, respectively. Then, the original set of CMYe data (C, M, Ye) is replaced by the newly-generated set of C'M'Ye'K data (C', M', Ye', K1).

It is noted that in S43, K data (K1) is generated based on CMYe data in the same manner as K data (K2) is generated based on CMYe data in S42. However, K data (K1) may be generated based on CMYe data in a manner different from the manner that K data (K2) is generated based on CMYe data in S42.

When CMYe data sets (C, M, Ye) for all the pixels are converted into C'M'Ye'K data (C', M', Ye', K1) or K data (K2), the process of S15 ends, and the process proceeds to S16 (FIG. 7).

Next, the black character detection processing (S11) will be described in greater detail while referring to the flowchart in FIG. 9.

It is noted that the black character detection processing (S11) is executed by the black character detection circuit 95a.

During the black character detection processing of S11, first, in S21, a RGB data set (R, G, B) for each of all the pixels (x, y) in the read image is read out from the line buffer 94.

Next, in S22, a set of RGB data (R, G, B) for each pixel is converted into a set of YIQ data (Y, I, Q) by the YIQ conversion circuit 95b by using the equation (1).

Next, in S23, a fine line detection processing is executed by the fine line detection circuit 95c to detect whether or not each pixel in the read image is a fine-line pixel. A fine-line code is added to a pixel that is judged as being a fine-line pixel.

Next, in S24, an edge detection processing is executed by the edge detection circuit 95d to detect whether or not each pixel in the read image is in an edge pixel. An edge code is added to a pixel that is judged as being an edge pixel.

Next, in S25, fine-line pixels determined in S23, and edge pixels determined in S24 are determined as character-area pixels, and a character area is defined as an area that is made up of the character-area pixels. As a result, the character area is determined in the read image.

It is now assumed that the line buffer 94 stores therein 25 sets of RGB data (R, G, B) for pixels (X1, Y1) to (X5, Y5) in the read image. It is also assumed that R data, G data, and B data in the 25 RGB data sets have values as shown in FIG. 10. In this case, YIQ data sets are obtained for those pixels (X1, Y1) to (X5, Y5) in S22 as also shown in FIG. 10. It is also assumed that the pixel at coordinates (X3, Y3) has been determined as an edge pixel in S24 and therefore is determined in S25 as being a character-area pixel that is located within the character area.

Next, in S26, character-area pixels in the character area are selected. More specifically, the circuit 95e detects whether or not each pixel is being added with a fine-line code or an edge code. When the pixel is being added with a fine-line code or an edge code, it is known that the subject pixel is a character-area pixel (a fine-line pixel or an edge pixels). In this way, the circuit 95e identifies character-area pixels in the image. Then, among the character-area pixels, one character-area pixel, which has not yet been subjected to a black character judging operation, is determined as a pixel 17 to be subjected to the black character judging operation.

It is now assumed that the character-area pixel at coordinates (X3, Y3) is now set as the subject pixel 17 as shown in FIG. 10.

Next, in S27, a 3×3 matrix area, centered on the subject pixel 17, is set as a subject area 18. In this example, a 3×3 matrix area, which is centered on the subject pixel 17, is set up as the subject area 18 as shown in FIG. 10. Also in S27, a pixel with the lowest brightness value within the subject area 18 is set as a judgment pixel 19.

It is noted that if there are more than one pixels having the lowest brightness value within the subject area 18, any one of these pixels may be selected. For example, one pixel that has been obtained first among the more than one pixel during the scanning operation or that has the lowest coordinates among the more than one pixel may be selected. In this example of FIG. 10, pixels at three coordinates of (X4, Y2), (X4, Y3), and (X4, Y5) have the same lowest value "0". In this example, the pixel at the lowest coordinates (X4, Y2) that has the lowest coordinates is selected. It is noted, however, that another selection method may be employed. In this example, as shown in FIG. 10, the lowest-brightness pixel (X4, Y2) is set as the judgment pixel 19 in the 3×3-matrix subject area 18.

Next, in S28, another 3×3 matrix area, centered on the judgment pixel 19 (X4, Y2), is determined as an area of judgment 20. Also in S28, the average of the chroma components I at all the pixels in the judgment area 20 is calculated. The average of the chroma components Q at all the pixels in the judgment area 20 are also calculated.

Next, in S29, it is determined whether or not an absolute value of the calculated chroma component (I) average is less than the first predetermined threshold T1.

If the absolute value of the chroma component (I) average is less than the first threshold T1 (S29: Yes), it is further determined in 530 whether or not an absolute value of the calculated chroma component (Q) average is less than the second predetermined threshold T2.

If the absolute value of the chroma component (Q) average is less than the second threshold T2 (S30: Yes), the process proceeds to S31, in which the subject pixel 17 is determined to be an achromatic pixel. Addition of a black code to the YIQ data set (Y, I, Q) for the subject pixel 17 is specified.

In this way, the threshold T1 is set for the chroma component (I), and the second threshold T2 is set for the chroma component (Q). If the absolute value of the calculated average of chroma component (I) is smaller than the threshold T1 and the absolute value of the calculated average of chroma component (Q) is smaller than the threshold T2, the subject pixel 17 is determined as being an achromatic pixel.

In this example of FIG. 10, the average values 21 of chroma components I and Q for the judgment pixel 19 are "−4" and "14", respectively. If the absolute value "4" of the chroma component (I) average value 21 is smaller than the first threshold T1 and the absolute value "14" of the chroma component (Q) average value 21 is smaller than the second threshold T2, the subject pixel 17 is determined as being an achromatic pixel.

Next, in S32, it is determined whether or not the processes of S26-S31 have been completed for all the character-area pixels. If the processes of S26-S32 have been completed for all the character-area pixels (S32:Yes) the black character judgment process (S61) ends.

On the other hand, it the processes of S26-S31 have not yet been completed for all the pixels in the character area (S32: No), the processing flow returns to S26, and processes of S26 through S32 are executed repeatedly until judgment has been completed for all the character-area pixels.

It is noted that if a plurality of character areas are formed separately from one another in the single image, the processes of S26-S32 are executed sequentially for the respective character areas. Processing ends when the processes of S26-S32 have been completed for all the character-area pixels in all the character areas.

If it is determined that the absolute value of the chroma component (I) average is greater than or equal to the first threshold T1 (S29: No), the processing flow proceeds directly to S32. Similarly, if it is determined that the absolute value of the chroma component (Q) average is greater than or equal to the second threshold (S30: No), the processing flow proceeds directly to S32.

The above description is given for the example where the processes of S26-S32 are executed for the edge pixel 17 shown in FIG. 10. However, the processes of S26-S32 may be executed in the same manner as described above for fine-line pixels.

More specifically, it is now assumed that R, G, and B data in the RGB data sets for 25 pixels (X1, Y1) to (X5, Y5) in the read image are as shown in FIG. 11. In this case, Y data, I data, and Q data in the YIQ data sets are obtained in S22 for those pixels (X1, Y1) to (X5, Y5) as also shown in FIG. 11.

It is also assumed that the pixel at coordinates (X3, Y3) is determined as a fine-line pixel in S23 and therefore is determined as being a character-area pixel in S25. It is also assumed that the pixel at coordinates (X3, Y3) is set as the subject pixel 17 in S26.

In this case, in 327, a 3×3 matrix pixel area 18 centered on the subject pixel 17 is selected as the subject area 18, and pixel (X3, Y2) with the lowest brightness in this pixel area 18 is set as the judgment pixel 19. Because three pixels (X3, Y2), (X3, Y3), and (X3, Y4) have the same lowest brightness value, the pixel (X3, Y2) with the lowest coordinates is selected as the judgment pixel 19.

Next, in S28, a 3×3 matrix pixel area 20 centered on the pixel of judgment 19 is determined as the judgment area 20. Average values of chroma components I and Q are then calculated in the judgment area 20.

It is judged in S29 and S30 whether or not the subject pixel 17 is achromatic according to whether or not the absolute values of the averages 21 are smaller than the first and second thresholds T1, T2.

It is noted that the averages 21 of the chroma components in the judgment area 20 are considered as the averages 21 of the chroma components at the judgment pixel 19. It can therefore be said that it is judged whether or not the subject pixel 17 is achromatic by detecting the average values of chroma components at the judgment pixel 19 that has the lowest brightness among the pixels around the subject pixel 17. Thus, even if color misalignment occurs around the subject pixel 19 in the RGB data in FIG. 10 or 11, the judgment point can be shifted from the subject pixel 17 to the judgment pixel 19 that has the lowest brightness and therefore that has the highest degree of color superimposition. In other words, the judgment pixel 19 is the pixel least affected by color misalignment and therefore represents the original document color with the highest reliability. Because judgment is executed at the judgment pixel 19, the effect of color misalignment can be reduced effectively. Consequently, by using this method to carry out the achromatic judgment for the subject pixel 17, it is possible to execute color misalignment correction onto the subject pixel 17 and improve the definition or clearness of a resultant output image. In this way, color misalignment occurring in black characters due to the reading device can be eliminated, and a well-defined image that is free from color bleeding can be obtained in a resultant print image.

As described above, in the black character detection processing of the present embodiment, RGB data read from the line buffer 94 is converted into YIQ data. For a subject pixel 17 (X3, Y3), a subject area 18 centered on the subject pixel 17 is set, and a judgment pixel 19 that has the lowest brightness in the subject area 18 is set. Then, a judgment area 20 is set as being centered on the judgment pixel 19. If the absolute values of the averages 21 of chroma components I and Q in the judgment area 20 are both less than the corresponding thresholds T1 and T2, the subject pixel 17 is determined as being an achromatic pixel.

Black codes are added to fine-line pixels and edge pixels (character-area pixels) if the fine-line pixels and edge pixels are determined as being achromatic. Thus, the fine-line pixels and edge pixels can be specified as to be printed in black monochromatic ink. Therefore, black character or similar fine-line or edge part images can be outputted with high quality.

Next, the edge detection processing of S24 will be described.

The edge detection processing is executed by the edge detection circuit 95b.

During the edge detection processing, detection is carried out using the brightness (Y) value of each of all the pixels in the read image. Therefore, Y data is first extracted from the YIQ data sets (Y, I, Q) for all the pixels (x, y), which have been obtained in S22.

Then, for each pixel (x, y), a 3×3 matrix area centered on the subject pixel is determined, and the edge amount g(x,y) is calculated for the subject pixel (x,y) by using the formula (2) and by using the Sobel filters SF1 an SF2. Then, the calculated edge amount g(x,y) is compared with the threshold. When the edge amount g(x,y) is greater than the threshold, the pixel (x, y) is determined as an edge pixel, and an edge code is added to the YIQ data set for the subject pixel (x, y). On the other hand, when the calculated edge amount g(x,y) is smaller than or equal to the threshold, the pixel (x, y) is not determined as an edge pixel.

The above-described detection is executed for all the pixels (x, y) in the read image.

Next, the fine line detection processing of S23 will be described with reference to the flowchart in FIG. 12.

The fine line detection processing is executed by the fine line detection circuit 95c.

During the fine line detection processing, detection is carried out using the brightness (Y) value of each of all the pixels in the read image. Therefore, Y data is first extracted in S120 from the YIQ data sets (Y, I, Q) for all the pixels (x, y), which have been obtained in S22.

It is now assumed that R, G, and B data in RGB data sets for pixels (X1, Y1) to (X5, Y5) in the read image are as shown in FIG. 13. In this case, Y data indicating brightness (Y) values for those pixels (X1, Y1) to (X5, Y5) are obtained as also shown in FIG. 13.

Next, in S121, pixels which have not yet been subjected to the fine-line detection of S23 are determined as not-yet-judged pixels, and one pixel that has the lowest coordinate value among the not-yet-judged pixels is selected as a subject pixel. It is now assumed that the pixel at coordinates (X3, Y3) is set as the subject pixel 17 as shown in FIG. 13.

Next, in S122, a 3×3 matrix area, centered on the subject pixel 17, is determined as a subject area 18.

In this case, the 3×3 matrix area, which is centered on the subject pixel 17, is set up as the subject area 12.

Next, in S123, point values "0", "1", "2", "3", "4", "5", "6", "7", and "8" are assigned to the matrix-element pixels constituting the 3×3-matrix subject area 18. As shown in FIG. 13, the point values are assigned so that the top-left matrix-element pixel with coordinates (X2, Y2) has a value or "0", the matrix element with coordinates (X3, Y2) has a value of "1", the matrix element with coordinates (X4, Y2) has a value of "2", the matrix-element pixel with coordinates (X2, Y3) has a value of "3", the subject pixel 17 with coordinates (X3, Y3) has the median value "4", the matrix-element pixel with coordinates (X4, Y3) has a value of "5", the bottom-left matrix-element pixel with coordinates (X2, Y4) has a value of "6", the matrix element with coordinates (X3, Y4) has a value of "7", and the bottom-right matrix element with coordinates (X4, Y4) has a value of "8".

Then, in S124, among the pixels in the matrix area 18, one pixel 22 with the lowest brightness value Y, another pixel 22 with the second lowest brightness value Y, and another pixel 22 with the third lowest brightness value Y are extracted in this order. The point values of the three extracted pixels 22 are summed up together.

In this example of FIG. 13, three pixels 22 at coordinates (X3, Y2), coordinates (X3, Y3), and coordinates (X3, Y4) are extracted from the subject area 18. The total value of the point values of "1", "4", and "7" for those three pixels 22 is calculated.

Next, in S125, it is determined whether or not the total point value of the three extracted pixels 22 is equal to "12". If the total point value is equal to "12" (S125: Yes), it is known that the three extracted pixels 22 are in a connected state because the total point value is equal to 12. Then, the process proceeds to S126.

In S126, an intermediate value between the maximum Y value and the minimum Y value in the matrix area 18 is calculated.

In the example of FIG. 13, matrix elements 22 with point values "1", "4", and "7" are extracted in S124. Because the total of these point values is "12" (yes in 5125), the extracted pixels are determined to be in a connected state. Then, in S126, the sum of the minimum brightness (Y) value "90" in the subject area 18 and the maximum brightness (Y) value "223" in the subject area 18 is divided by two, giving an intermediate value of "157".

Next, in S127, pixels in the subject area 18 that have a brightness value (Y) lower than the intermediate value are detected, and the number of these pixels is counted. In this example, as shown in FIG. 13, three pixels 23 at coordinates (X3, Y2), coordinates (X3, Y3), and coordinates (X3, Y4) are detected as having brightness (Y) values lower than the intermediate value "157".

It is then determined in S128 whether or not the counted number of the detected pixels is less than four. If the number of the detected pixels is less than four (S128: Yes), it is known that there is a significant difference between the density of the extracted pixels 22 in the subject area 18 and the density of the non-extracted pixels in the subject area 18. Accordingly, the process proceeds to S129, in which the subject pixel 17 is determined as a fine-line pixel, and addition of a fine-line code to the YIQ data set (Y, I, Q) for the subject pixel 17 is specified.

As shown in FIG. 13, because the number of pixels 23 detected in S127 is three and is less than four (yes in S128), the subject pixel 17 (X3, Y3) is determined as a fine-line pixel, and a fine-line code is added to the subject pixel 17 (X3, Y3).

Next, in S130, it is determined whether or not the fine line judgment has been completed for all the pixels within the read image. If judgment has been completed for all the pixels (S130: Yes), this fine line detection processing ends.

On the other hand, if it is determined in S130 that judgment has not yet been completed for all the pixels (S130: No), the processing flow returns to S121, and S121 through S130 is executed repeatedly until judgment has been completed for all the pixels in the image.

If it is determined in S125 that the total point value of the three pixels 22 extracted in S124 is different from "12" (S125: No), it is determined that the subject pixel 17 is not in a connected state. Accordingly, the processing flow proceeds directly to S130.

If it is determined in S128 that the counted number of the pixels 23 detected in S127 is four or more (S128: No), it is determined that the subject pixel 17 is not a fine-line pixel because there is no significant difference between the density of the, extracted pixels 22 and the density of the non-extracted pixels. Accordingly, the processing flow proceeds directly to S130.

As described above, according to the fine line detection processing of S23, when one pixel to be subjected to the fine line detection processing, is determined as a subject pixel 17, a 3×3 matrix area centered on this subject pixel 17 is set as a subject area 18. Point values "0" to "8" are assigned to the matrix elements constituting this 3×3 matrix subject area 18. Then, three pixels 22 with the first, second, and third lowest brightness values are extracted from the subject area 18. When the total point value of the three extracted pixels 22 is equal to "12", the extracted pixels 22 are determined as being in a connected state. Then, an intermediate value "157" is calculated from the minimum and maximum values of brightness (Y) of pixels in the subject area 18. When the number of pixels with a brightness (Y) value smaller than the intermediate value is less than 4, the subject pixel 17 is determined as being a fine-line pixel. A fine-line code is added to the subject pixel 17 that is determined as being a fine-line pixel.

In this way, during the fine line detection processing of S23, even a one-dot fine-line, which is difficult to detect during the edge part detection of S24, can be detected with certitude. Accordingly, fine-line image data that is read as a lighter color due to the influence of the peripheral image part or other colors in the original document, can be corrected appropriately. It is possible to improve the contrast of black characters composed of black fine lines, and to obtain a high-quality print image, without adversely affecting other image parts.

<First Modification of Black Character Judgment>

It is noted that according to the processes of S26 through S31, the subject pixel 17 is determined as achromatic when the judgment area 20 has relatively small chroma component averages, that is, when the color of the judgment area 20 is located substantially on an achromatic axis (gray axis) that extends from white through gray to black. Accordingly, in S31, the black code is added not only to black pixels but also to gray and white pixels.

If it is desired to add a black code to black pixels only, the process of S11 may be modified by adding an additional judging process of S33 between S30 and S31 as shown in FIG. 14.

During the additional judging step of S33, it is judged whether or not the brightness Y of the judgment pixel 19 is less than a prescribed threshold T3. The threshold T3 is a very small value, such as "02h", for example, that is sufficiently close to "00h".

In this modification, even when the judgment of S30 is affirmative, the process will not proceed to S31 directly, but can proceed to S31 only when the brightness Y of the judgment pixel 19 is less than the prescribed threshold T3. Accordingly, when the judgment pixel 19 is substantially black, the process proceeds to S31, wherein the subject pixel 17 is added with a black code. On the other hand, when the brightness Y of the judgment pixel 19 is greater than or equal to the prescribed threshold T3, the process proceeds to S32. Accordingly, the subject pixel 17 is not added with a black code.

It is preferable that the amount of the threshold T3 may be changed by a user. By setting the threshold T3 as a low value that is close to black as described above, it is possible to determine that the subject pixel 17 is achromatic only when the judgment pixel 19 has a density less than the threshold and therefore appears substantially black. Therefore, it is possible to add a black code only to black pixels. Only black pixels will be printed in black ink monochrome. It is possible to eliminate color misalignment in black images and to output well-defined black images.

On the other hand, by setting the threshold T3 as a comparatively high value, it is possible to determine that the subject pixel 17 is achromatic even when the judgment pixel 19 has a certain degree of lightness and appears gray In this case, it is possible to add a black code not only to black pixels but also to gray pixels. It is possible to print in black ink monochrome not only for black pixels but also for gray pixels. Even if color misalignment occurs at gray pixels on the edge of fine-line part, the color misalignment can be eliminated, and a well-defined gray image can be obtained.

As described above, according to the present embodiment and modification, a pixel with the smallest brightness component Y in the subject area 18 that is centered on the subject pixel 17 is set as a judgment pixel 19. Then, determination as to whether or not the subject pixel 17 is achromatic is executed based on the judgment pixel 19. Because the brightness component value Y of a pixel directly indicates the degree of achromaticity of that pixel, it is possible to identify an achromatic pixel in an image accurately by using the brightness value Y.

It the absolute values of the average values of chroma components in the judgment area 20, centered on the judgment pixel 19, are smaller than the predetermined thresholds, the subject pixel 17 is determined to be an achromatic pixel. Therefore, an achromatic pixel can be identified accurately.

In general, when image processing is executed, due to the reading device, etc., it may happen that R, G, and B color signals read from different pixel positions are erroneously used as data for the same pixel. According to such a misaligned reading, a pixel that is originally achromatic is not read as an achromatic pixel but is read as a chromatic pixel. According to the present embodiment, whether or not a subject pixel 17 is a achromatic is not determined directly, but instead, a pixel with the lowest brightness among the adjacent pixels around the subject pixel 17 is taken as a judgment pixel 19. It is determined whether or not the subject pixel 17 is an achromatic pixel by judging the average values of the chromatic components of pixels around the judgment pixel 19. Within the judgment area 20, color signals of the judgment pixel 19 are superimposed to the greatest extent. Therefore, color misalignment occurs the slightest at the judgment pixel position. Accordingly, color signals of the judgment pixel 19 are close to the true color signals of the subject pixel 17. Additionally, the achromatic pixel determination is performed based on average values of chroma components of the pixel area 20 that is centered on the judgment pixel 18. It is therefore possible to correct and subtract color misalignment at the subject pixel 17, and to accurately determine whether or not the subject pixel 17 is an achromatic pixel.

According to the present embodiment, RGB color signals of each pixel are converted into data of a brightness component Y of the subject pixel and data of two chroma components I and Q of the subject pixel. In the subject area 18, one pixel with the lowest brightness component Y is set as the judgment pixel 19. An average is calculated for each of the two chroma components I and Q, and each calculated average is compared with a corresponding threshold T1, T2. If each average is less than the corresponding threshold, the subject pixel 17 is determined as being an achromatic pixel. Determination as to whether or not the subject pixel 17 is an achromatic pixel can thus be performed accurately.

If the achromatic judgment were executed incorrectly and achromatic pixels, especially achromatic pixels of deep density, appear inadvertently in a resultant color output image, the achromatic pixels will give an inadvertent effect on the output image. However, according to the present embodiment, whether or not the subject pixel is achromatic can be performed accurately, and the inadvertent appearance of achromatic pixels due to incorrect judgment can be prevented.

It is noted that RGB color signals of each pixel may be converted into a brightness component Y and three or more chroma components of that pixel. An average is calculated for each chroma component, and each calculated average is compared with a corresponding threshold. If all the averages are less than the corresponding thresholds, the subject pixel 17 is determined to be an achromatic pixel.

The subject area 18 centered on the subject pixel 17 is a 3-row×3-column matrix area. The 3-row×3-column matrix area 18 centered on the subject pixel 17 is the smallest-unit area that contains all the pixels adjacent to the periphery of the subject pixel 17. Consequently, the minimum quantity of data can be acquired uniformly from this area, thereby improving the reliability of selection of the judgment pixel 19. Because the subject area 18 can be set as an appropriate, smallest-unit pixel area, it is possible to efficiently execute various kinds of processing for performing achromatic area judgment.

The judgment area 20 centered on the judgment pixel 19 is a 3-row×3-column matrix area. The 3-row×3-column matrix area 20 centered on the judgment pixel 19 is the smallest-unit area that contains all the pixels adjacent to the periphery of the judgment pixel 19. Accordingly, the minimum quantity of data can be acquired uniformly from this area, improving the reliability of calculation of the chromatic averages. Because the judgment area 20 can be set as an appropriate, smallest-unit pixel area, it is possible to efficiently execute various kinds of processing for performing achromatic area judgment.

According to the present embodiment, print data for achromatic pixels is generated as achromatic print data (K2) in S15. Then, the achromatic print data (K2) is outputted. Accordingly, it is possible to generate and output achromatic print data (K2) for those pixels that are originally achromatic.

It is noted that in the present embodiment, an output image is printed on a paper surface using the recording device (printer). However, visualization (reproduction of image data) can also be achieved by performing output to another suitable device. For example, an output image may be displayed on a display device such as a CRT.

If color misalignment occurs on the RGB data generated at the CCD line sensor 2 but if the process of S15 were not provided, pixels that are originally achromatic (achromatic pixels) will not be outputted as achromatic. If achromatic pixels were outputted as chromatic pixels at the edge of an achromatic area, colored ink bleeding will occur at the edge of the achromatic area, and the definition of the achromatic area will be decreased. However, according to the present embodiment, K print data (K2) will be generated for achromatic pixels. Therefore, pixels that are originally achromatic can be reproduced as achromatic images, and therefore a well defined achromatic image can be obtained.

According to the present embodiment, black print data (K2) is outputted for the achromatic character pixels. Thus, output of black monochromatic ink can be specified for the black character pixels. Character images or the like are often black. If character images were not outputted as black due to color bleeding or due to decrease in density, the contrast and image quality of the character images will be decreased. However, according to the present embodiment, when a pixel is determined to be an achromatic character pixel, black print data (K2) is generated to specify that the subject pixel will be printed by black ink only Therefore, the definition of the black characters can be improved.

Especially, according to the present embodiment, a full-color image is printed by having cyan, magenta, yellow, and black recording materials superimposed by the ink-jet printing device. Black formed by superimposing these cyan, magenta, and yellow recording materials does not appear as perfectly black because of the optical characteristics of the recording materials. However, according to the present embodiment, in order to represent black characters, the K print data is generated and is used to print black characters. It is therefore possible to attain achromatic-character printing in a separate fashion from normal printing, that is, by using a black monochrome recording material but without using cyan, magenta, or yellow recording materials. As a result, black pixels can be reproduced perfectly black, and contrast can be improved.

It is noted that instead of outputting black print data (K2), it is possible to output any other achromatic print data, such as gray print data, to specify ejection of achromatic monochromatic ink for achromatic character pixels.

Especially, in the present embodiment, when a pixel detected as a pixel of a fine-line part or edge part is determined as being achromatic, the K print data (K2) is generated for the subject pixel. It is thus possible to improve the definition of edge parts and fine-line parts, which greatly affect the quality of an image, and so improve image quality.

According to the present embodiment, identification of achromatic pixels is executed only on those pixels in fine-line line parts and edge parts, which greatly affect an image. It is therefore possible to improve image quality while executing the entire processing efficiently.

Moreover, since fine-line parts and edge parts are often characters, it is possible to output a high-quality image, in which the definition or contrast of characters relative to the background is ensured.

<Second Modification of Black Character Detection Process>

In the above-described embodiment, after the circuits 95*c* and 95*d* determine a character area in the read image by execution of the fine line detection processing (S23) and the edge detection processing (S24), the circuit 95*e* judges whether or not the pixels in the character area are achromatic, and then the circuit 95*f* adds black codes to such pixels that are located in the character area and that are achromatic.

However, the circuit 95*e* may judge whether or not each pixel in the read image is achromatic, simultaneously when the circuits 95*c* and 95*d* judge whether or not each pixel is in a fine-line part or an edge part. Thereafter, the circuit 95*f* adds a black code to such a pixel that is determined as being achromatic and as being located in the character area.

Alternatively, the circuit 95*e* can first judge whether or not each pixel in the read image is achromatic. Then, the circuits 95*c* and 95*d* judge whether or not each achromatic pixel in the read image is in a fine-line part or an edge part. Thereafter, the circuit 95*f* adds a black code to such a pixel that is achromatic and that is located in the character area. In order to realize this flow of processes, the black character judging process of S11 may be modified as shown in FIG. 15

Driving this process, first, the processes of S21 and S22 are executed in the same manner as in the embodiment. That is, RGB data for all the pixels in the read image is read out from the line buffer 94 in S21. Then, in S22, the RGB data is converted into YIQ data.

Next, in S26', among all the pixels in the read image, a pixel that has not yet been subjected to an achromatic area judging process is set as a subject pixel 17.

Then, the processes of S27 to S30 are executed to the subject pixel 17 in the same manner as in the above-described embodiment. When the judgment of S30 is affirmative (yes in S30), the process proceeds to S210, in which the subject pixel 17 is set as a pixel in an achromatic area.

Then, in S215, it is judged whether or not all the pixels in the read image have been subjected to the achromatic area judging process. If there are any pixels that have not yet been judged (no in S215), the process returns to S26', and the processes of S26' to S210 are repeated until all the pixels have been judged. When all the pixels have been judged (yes in S215), the process proceeds to S220. In this way, pixels (achromatic pixels) located within an achromatic area in the read image are determined.

Next, in S220, among all the pixels within the achromatic area, a pixel which has not yet been subjected to a fine-line detection or an edge part detection is set as a subject pixel 17.

In S23', it is judged whether or not the subject pixel 17 is in a fine-line part. The process of S23' is the same as that of S23 (FIG. 12) except that the processes of S23' is executed only to the subject pixel 17. In other words, Y data only for the subject pixel 17 is extracted in S120, and the process of S121 or S130 in S23 is not executed in S23'.

Then, in S24', it is judged whether or not the subject pixel 17 is in an edge part. The process of S24' is the same as that of S24 except that the processes of S24' is executed only for the subject pixel 17. In other words, in S24', a 3×3 matrix area is set up for the subject pixel 17 and the equation (2) is calculated. A resultant edge amount g(x,y) is compared with the threshold. When the edge amount g(x,y) is greater than the threshold, the subject pixel 17 is determined as an edge pixel.

It is then judged in S230 whether or not the subject pixel 17 has been determined as a fine-line pixel or an edge pixel in S23' or S24'. If the subject pixel 17 is a fine-line pixel or an edge pixel (yes in S230), a black code is added to the subject pixel in S240. Then, it is judged in S250 whether or not all the pixels in the achromatic area have been subjected to the fine-line detection and the edge detection. If any pixels have not yet been detected (no in S250), the process returns to S220, and the processes of S220-S250 are repeated until all the pixels in the achromatic area have been detected. If all the pixels in the achromatic area have been detected (yes in S250), the process ends. On the other hand, if the subject pixel 17 is not a fine-line pixel or an edge pixel (no in S230), the process proceeds directly to S250.

<Third Modification of Black Character Detecting Process>

In the above-described embodiment, for a pixel that is judged as being achromatic, CMYe data for the subject pixel is converted into K data in S15.

However, for a pixel that is determined as being achromatic in S11, RGB data (R, G, B) of the subject pixel may be corrected so that the R data, G data, and B data will have the same values. That is, RGB data is corrected so that R data, G data, and B data in the RGB data will satisfy the equation of R data=G data=B data.

More specifically, after YIQ data for the achromatic pixel is converted back to RGB data in S13, the RGB data with a black code is corrected so as to satisfy the equation of R data=G data=B data. The direct map process in S14 may be modified to convert RGB data with R data=G data=B data into K data only. In this case, during the black generation process of S15, the step S42 may be omitted.

In this modification, RGB data for the subject pixel 17 may be corrected to satisfy the equation of R data=G data=B data=0 if the subject pixel 17 is determined as being achromatic in S11. The subject pixel 17 can be printed in complete black.

Instead of setting R data=G data=B data=0, RGB data for the subject pixel 17 may be corrected to satisfy the equation of R data=G data=B data=Min, wherein the value Min is equal to the lowest value among the R, G, and B data. The subject pixel 17 can be printed in achromatic color.

Or, RGB data for the subject pixel 17 may be corrected to satisfy the equation of R data=G data=B data Ave, wherein the value Ave is equal to the average of the R, G, and B data. Also in this case, the subject pixel 17 can be printed in achromatic color.

While the invention has been described in detail with reference to the specific embodiment thereof, it would be apparent to those skilled in the art that various changes and modifications may be made therein without departing from the spirit of the invention.

For example, in the above-described embodiment and modifications, RGB color data read by the CCD line sensor 2 is inputted from the A/D conversion circuit 3 to the CPU 91, and then stored in RAM 93. However, RGB color data may be inputted from the A/D conversion circuit 3 directly to the RGB data conversion circuit 95 via an input port. It is possible to prevent a large quantity of image data from being inputted to the CPU 91. The control load of the CPU 91 can be reduced.

In the above-described embodiment, a black code is added directly to YIQ data of the achromatic character pixel. However, a black code may be stored in correspondence with the pixel coordinates of the black-character pixel. Because the pixels in the image are managed by means of the coordinates, by storing the black code in correspondence with the coordinates of each black-character pixel, it is no longer necessary to determine the addition of black codes during each image data conversion process of S13 or S14. The entire process can be executed efficiently.

In the above-described embodiment, each RGB data set is converted into a set of YIQ data that includes one brightness data (Y) and two chroma data (I) and (Q). However, RGB data may be converted into another set of data that includes at least one brightness data and at least one chroma data.

In the above-described embodiment and modifications, the edge detection and the fine-line detection are executed. However, the edge detection and the fine-line detection may not be executed. More specifically, the processes of S23 through S25 may be omitted from the black character judging process of S11. In this case, in S26, the subject pixel 17 is set to a pixel, which has not yet been subjected to the achromatic area judgment, among all the pixels within the entire image. In S32, it is judged whether or not there are some pixels not yet judged in the entire image. In this way, in S26-S32, it is possible to judge whether each pixel in the entire image is achromatic regardless of whether the subject pixel is a fine-line part pixel, an edge pixel, or not any fine-line or edge pixel.

The processes in the edge detection of S24 and the processes in the fine-line detection of S23 may be modified in various manners.

What is claimed is:

1. An image processing device, comprising:
    data receiving means for receiving a plurality of sets of digital input signals for a plurality of pixels that constitute a desired image, each set of digital input signals including digital input signals for at least three color components indicative of a color state of the corresponding pixel;
    subject area setting means for setting a subject area that is formed from several pixels, the several pixels including a subject pixel to be processed and being arranged adjacent to one another, the subject pixel being located at a center of the subject area;

judgment pixel setting means for setting, as a judgment pixel, a pixel that has the smallest brightness in the subject area; and achromatic determining means for determining whether or not the subject pixel is achromatic by judging the chroma component of the judgment pixel.

2. An image processing device as claimed in claim 1, wherein the achromatic determination means includes:

judgment area setting means for setting a judgment area that is formed from several pixels that include the judgment pixel and that are arranged adjacent to one another, the judgment pixel being located at a center of the judgment area;

chroma average calculating means for calculating an average value of chroma of the several pixels that form the judgment area;

chroma average comparing means for comparing the average value with a predetermined threshold and for determining that the subject pixel is achromatic when the average value is smaller than the predetermined threshold.

3. An image processing device as claimed in claim 2, further comprising data conversion means for converting the received one set of input signals for each pixel into a brightness-component signal indicative of a brightness component of the subject pixel and a plurality of chroma-component signals indicative of a plurality of different chroma components, wherein the judgment pixel setting means sets, as the judgment pixel, a pixel having the lowest brightness component within the subject area, wherein the chroma average calculating means calculates the average value of each chroma component of the pixels in the judgment area, and wherein the chroma average comparing means compares the calculated average for each chroma component with a corresponding predetermined threshold, the chroma average comparing means determining that the subject pixel is achromatic when all the averages are smaller than the corresponding thresholds.

4. An image processing device as claimed in claim 1, wherein the plurality of pixels are arranged horizontally and vertically in the desired image, each row extending horizontally and each column extending vertically, and wherein the subject area setting means sets, as the subject area, a 3-row×3-column matrix area, in which nine adjacent pixels are arranged in three rows and in three columns, the subject pixel being one of the nine pixels and being located in the center of the 3-row×3-column matrix area.

5. An image processing device as claimed in claim 2, wherein the plurality of pixels are arranged horizontally and vertically in the desired image, each row extending horizontally and each column extending vertically, and wherein the judgment area setting means sets, as the judgment area, a 3-row×3-column matrix area, in which nine adjacent pixels are arranged in three rows and in three columns, the judgment pixel being one of the nine pixels and being located in the center of the 3-row×3-column matrix area.

6. An image processing device as claimed in claim 1, further comprising:

color outputting means for outputting a color image based on a set of output signals for each pixel, the color outputting means outputting achromatic material based on an achromatic output signal and outputting chromatic material based on a chromatic output signal;

output signal generating means for generating, for each pixel, an output signal based on the set of input signals; and achromatic outputting means for controlling the output signal generating means to generate the achromatic output signal for the subject pixel when the achromatic determining means determines that the subject pixel is achromatic, the achromatic outputting means controlling the output signal generating means to generate the chromatic output signal for the subject pixel when the achromatic determining means determines that the subject pixel is not achromatic.

7. An image processing device as claimed in claim 6, wherein the achromatic outputting means includes input signal changing means for changing, when the subject pixel is determined as achromatic, the values of the input signals constituting the set of input signals for the subject pixel into the same values with one another, the output signal generating means generating the achromatic output signal for the subject pixel based on the changed input signals.

8. An image processing device as claimed in claim 6, further comprising:

edge detecting means for detecting whether or not the subject pixel is in an edge part within the desired image; and fine-line detecting means for detecting whether or not the pixels is in a fine line part within the desired image, wherein the achromatic outputting means controls the output signal generating means to generate an achromatic output signal when the subject pixel is achromatic and the subject pixel is detected as being in at least one of the edge part and the fine-line part.

9. An image processing device as claimed in claim 6, wherein the achromatic output signal is a black output signal, the color outputting means outputting black material based on the black output signal.

10. An image processing method, comprising:

receiving a plurality of sets of digital input signals for a plurality of pixels that constitute a desired image, each set of digital input signals including digital input signals for at least three color components indicative of a color state of the corresponding pixel;

setting a subject area that is formed from several pixels, the several pixels including a subject pixel to be processed and being arranged adjacent to one another, the subject pixel being located at a center of the subject area;

setting, as a judgment pixel, a pixel that has the smallest brightness in the subject area; and determining whether or not the subject pixel is achromatic by judging the chroma component of the judgment pixel.

11. An image processing method as claimed in claim 10, wherein determining whether or not the subject pixel is achromatic includes:

setting a judgment area that is formed from several pixels that include the judgment pixel and that are arranged adjacent to one another, the judgment pixel being located at a center of the judgment area;

calculating an average value of chroma of the several pixels that form the judgment area;

comparing the average value with a predetermined threshold and determining that the subject pixel is achromatic when the average value is smaller than the predetermined threshold.

* * * * *